(12) United States Patent
Kumar

(10) Patent No.: US 6,269,080 B1
(45) Date of Patent: Jul. 31, 2001

(54) METHOD OF MULTICAST FILE DISTRIBUTION AND SYNCHRONIZATION

(75) Inventor: Brijesh Kumar, N. Delta (CA)

(73) Assignee: Glenayre Electronics, Inc., Charlotte, NC (US)

( * ) Notice: Subject to any disclaimer, the term of this patent is extended or adjusted under 35 U.S.C. 154(b) by 0 days.

(21) Appl. No.: 09/291,694

(22) Filed: Apr. 13, 1999

(51) Int. Cl.$^7$ ............................ G01R 31/08; H04L 12/28; G06F 15/16

(52) U.S. Cl. ..................... 370/236; 370/390; 370/244; 709/235; 709/224

(58) Field of Search .............................. 370/390, 216, 370/231, 235, 234, 389, 229, 242, 400; 709/245, 239, 235, 206, 238, 228, 224, 232; 714/748

(56) References Cited

U.S. PATENT DOCUMENTS

| | | |
|---|---|---|
| 3,715,725 | 2/1973 | Kievit et al. . |
| 4,725,834 * | 2/1988 | Chang et al. ............................ 370/85 |
| 4,807,224 * | 2/1989 | Naron et al. ............................ 370/94 |
| 5,036,518 | 7/1991 | Tseung . |
| 5,077,132 | 12/1991 | Maruno et al. . |
| 5,109,384 | 4/1992 | Tseung . |
| 5,255,268 | 10/1993 | Cato et al. . |
| 5,355,371 * | 10/1994 | Auerbach et al. ...................... 370/60 |
| 5,541,927 * | 7/1996 | Kristol et al. ......................... 370/94.2 |
| 5,727,002 * | 3/1998 | Miller et al. ............................ 371/32 |
| 5,905,871 * | 5/1999 | Buskens et al. ....................... 709/245 |

\* cited by examiner

Primary Examiner—Ajit Patel
Assistant Examiner—Hanh Nguyen
(74) Attorney, Agent, or Firm—Christensen O'Connor Johnson Kindness PLLC

(57) ABSTRACT

The present invention involves a method for multicast file distribution and synchronization in data networks. Specifically, the present invention includes a mechanism for efficient and reliable distribution of a data file from a single source to a large number of receivers using multicast distribution in wide area networks. The multicast file distribution is done by designating a receiver as an active receiver. The active receiver is selected using a novel token granting procedure. Once selected, the active receiver is responsible for generating retransmission requests as well as providing flow control feedback to the server during data transfer. All receivers on the network are offered a chance to become an active receiver in a controlled manner, and only one receiver can be an active receiver at any given time. This process continues until there are no receivers in the group with missing data segments. The second part of the protocol provides synchronization of the file version to ensure that all receivers have the last distributed version of the data file. In addition, the protocol allows newly joined receivers to request the file from the server. The protocol is suitable for applications where a server periodically distributes a new version of the data file to receivers in the network. In addition, the protocol can be deployed with or without the support of Internet Protocol (IP) multicast technology, and is not tied to any particular network topology or transmission medium./C

24 Claims, 14 Drawing Sheets

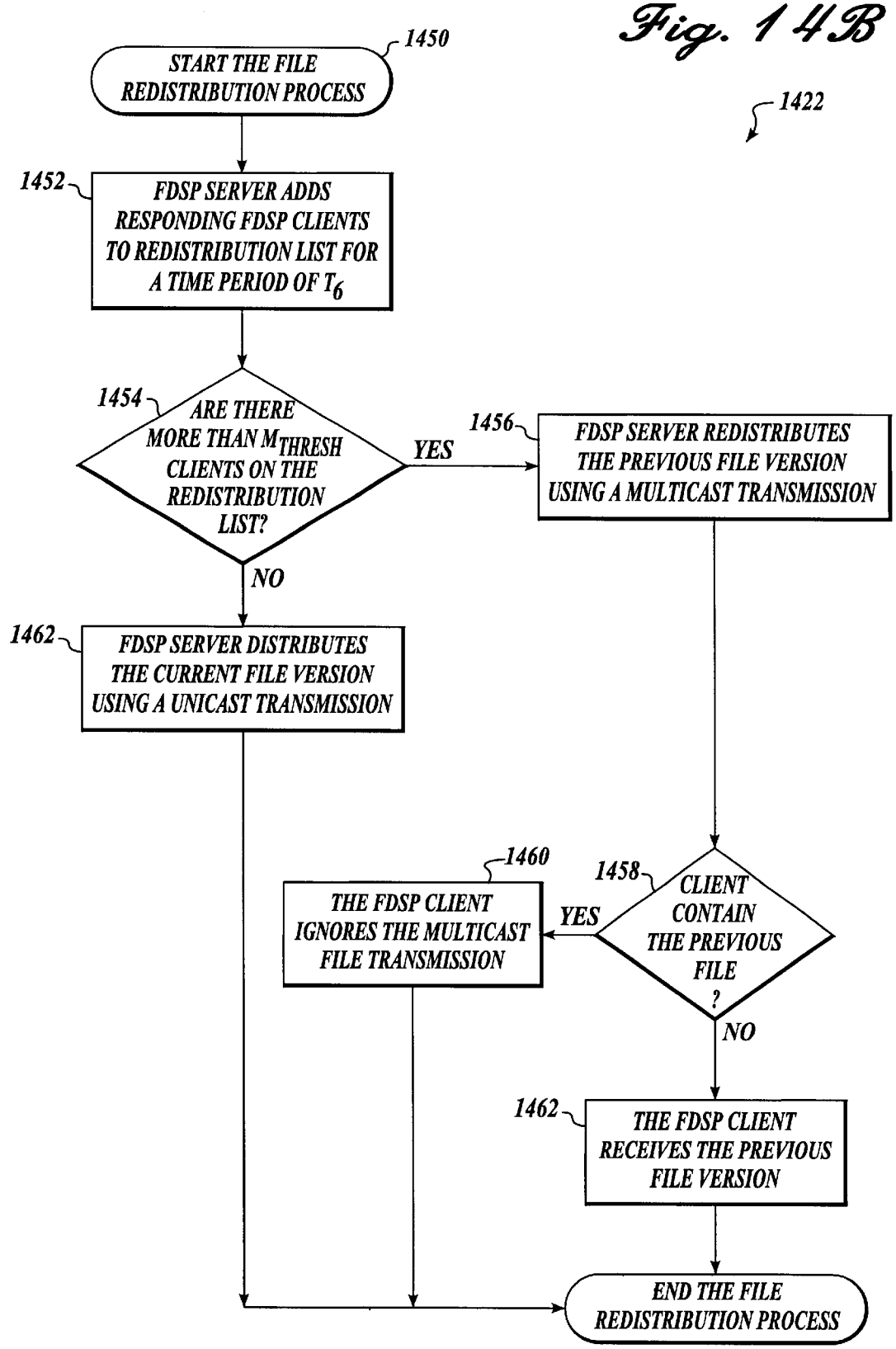

METHOD OF MULTICAST FILE DISTRIBUTION AND SYNCHRONIZATION

FIELD OF THE INVENTION

This invention relates to methods of multicast file distribution and file synchronization in computer networks. More specifically, the present invention provides a low-overhead method for distributing data to a target group of devices or nodes in a computer network and ensures that all members of the target group, including new members of the group are kept consistent with respect to the distributed data.

BACKGROUND OF THE INVENTION

Certain computer applications require reliable distribution of a single large file to a large set of receiving hosts. As known in the art, file distribution can be managed by either a multicast or unicast transmission. When dealing with a large number of receivers, the use of unicast protocols such as TCP is inefficient as it requires the sender to separately transmit data once to each target. Conversely, multicast sends data to a large number of receiving hosts in one simultaneous transmission. In a multicast transmission, the sender only transmits each data packet one time and an underlying multicast delivery mechanism efficiently delivers each packet to all of the targeted receivers. Thus, when dealing with a large number of receiving hosts, a multicast protocol is more desirable. However, the use of a multicast distribution requires additional mechanisms to ensure that all group members receive the complete set of data segments. In addition, other complications arise with these reliability mechanisms as they are applied to different multicast transport protocols.

One method that has been used to increase the reliability of data transmissions involves the use of unicast protocols. In unicast protocols, such as TCP, the sender achieves reliability by requesting acknowledgments for the data segments from the receiver. This model is not suitable for multicast distribution because the sender may become flooded with acknowledgments if every receiver sends an acknowledgment to the sender. This is known in the art as the acknowledgment (ACK) implosion problem. The use of this model in a multicast protocol presents an inefficient process that wastes a significant amount of network bandwidth. Hence, the primary goal in the design of reliable multicast protocols involves the goal of avoiding multiple acknowledgments from the receivers and managing these acknowledgments in an efficient way.

Reliable broadcast protocols have existed for quite some time. These protocols rely on the broadcast nature of the underlying network such as ethernet on local area network segments. However, techniques for reliable multicast transmissions over wide area networks (WAN's) are just emerging. One of the primary reasons that there is no established standard for reliable multicast is that different multicast applications have different requirements for transport protocols. For example, the requirements of non-interactive applications such as group distribution of a large file or data set has different requirements than interactive counterparts. Typically, non-interactive applications can tolerate much longer latencies, accept out of sequence packets, and may even tolerate extreme fluctuations in network throughput. In contrast, interactive multicast applications may tolerate some unreliability, but they have tighter performance bounds on latencies and network throughput.

Designs for multicast transport protocols can be characterized depending upon the node that is responsible for ensuring end-to-end reliability. The two popular approaches proposed to date are called sender-initiated and receiver-initiated. In the sender-initiated approach, the sender maintains the state information of all of the receiving clients. Here, the sender updates the state information as each receiving client sends an acknowledgment of the received data back to the sender. Each time the sender distributes data, the transmission is in the form of a multicast transmission targeted to all of the receivers. Each time a receiver correctly obtains a packet, it sends an acknowledgment by a unicast transmission to the sender. In contrast, in the receiver-initiated approach, each receiver sends a negative acknowledgment (NACK) message to the sender if it fails to receive a data packet. The NACK informs the sender if a data packet is missing or if the transmission errors. Here, the sender multicasts all packets, giving priority to retransmissions, and a receiver sends a NACK message each time it detects an error or a lost packet.

Since there are multiple receivers in a multicast transmission, the sender-initiated approach needs to have one control box of state information per receiver. The sender must also find the proper control box and update the state information for each received acknowledgment message. In contrast, in the receiver-initiated approach, the retransmission task is distributed to all receivers, as the sender keeps no state information on each receiver. Here, the sender simply responds to data requests each time a NACK is received. From this perspective, receiver-initiated protocols are far more scaleable than sender-initiated protocols.

Several methods known in the art disclose designs to improve reliability of multicast transport protocols that can handle one-to-many and many-to-many node distributions. Most of these protocols are based on the receiver-initiated multicast paradigm and they generally follow the model of multiple receivers sending NACK's to one sender. Because receivers communicate NACK's back to the sender, receiver initiated protocols have the possibility of experiencing a NACK-implosion problem if many receivers detect transmission errors. To avoid this problem, receivers use a NACK suppression scheme. Whenever a receiver detects a packet loss, it waits for a random time interval and then multicasts a NACK to the sender and all other receivers. When a receiver obtains a NACK for a packet that it has not received and for which it has started a timer to send a NACK, the receiver sets the timer and behaves as if it has sent a NACK. The expiration of a timer without the reception of the corresponding packet is the signal used to detect a lost packet. The goal of this scheme is to only send one NACK back to the source for a lost transmission for the entire group of receivers.

In other prior art, this basic NACK suppression mechanism has been slightly modified. For example, some protocols require receivers to send repair requests to the original sender and other nodes prescribe one or more special retransmission nodes and arrange them in a tree hierarchy. The introduction of the tree hierarchy only achieves scalability but it doesn't solve the basic problems with the algorithm. Theses NACK avoidance algorithms were designed for a limited size network, such as LAN or a network with a small number of Internet nodes. This is because the basic NACK-avoidance algorithm requires that timers be set based on update requests generated by every node. As the number of nodes increases, the work load for each node increases at an exponential rate. Even worse, nodes that are on congested networks may constantly interfere with the rest of multicast group by multicasting a large number of NACK's.

The requirement of multicast transmissions of NACK messages by all receivers to avoid NACK implosion is a major limitation of the prior art. These methods not only require the sender to have a multicast packet forwarding tree, but there should also be a forwarding tree at each receiver to multicast packets to other members. In addition, this NACK suppression scheme has increased limitations when the server and receivers are connected through long delay satellite links. Satellite links have transmission delays of several seconds. For the random delay NACK suppression scheme to work, receivers have to delay with time intervals longer than the combined transmission delay of the up and down links to the satellite.

Another drawback of existing multicast protocols is that they assume that the network supports IP multicast routing. In this configuration, it is assumed that all group members can be addressed by a single multicast group address. Most of these protocols will not work if the network does not support an IP multicast service. Unfortunately, support for IP multicast is not readily available in most existing network hosts and routers.

Other problems are presented with existing multicast protocols because they assume that the multicast application is the primary application in the network. Since their flow control is mostly modeled on TCP, their approach is to aggressively use most of the bandwidth available on the network. This is a reasonable approach for an Internet like data network. However, it is a poor approach for the subscriber oriented networks such as paging or cellular infrastructure networks. For example, in a commercial wireless data or voice network, a central server may need to distribute generic network configuration information to a large number of base stations, such as switches and RF controllers. These networks are subscriber-oriented because the main job of the infrastructure is to move packets carrying subscriber data or voice as efficiently as possible. The network management activities should not exceed a certain percentage of the available bandwidth.

In addition to proper management of the file distribution, protocols with multicast transport require all receivers to synchronize at periodic intervals during the data transfer phase to ensure reliability. This requirement introduces other problems such as fate sharing. Here, the data transfer progress of all receivers may be restricted to the progress of the slowest receiver. While this may be a useful requirement for the interactive applications, this is undesirable in many non-interactive applications where some receivers are connected with slow links. For example, the node connected to a fast T1 link at 1.544 Mbits/sec will be limited by other nodes connected to a slow 9600 bit/sec rate. For non-interactive bulk data transfers, this configuration would be completely unacceptable because one slow receiver would virtually stop the progress of the entire network.

Accordingly, this invention presents a novel multicast file distribution method that can efficiently distribute bulk data from one sender to a large number of receivers in wide area networks. As opposed to interactive multicast applications, this method is designed to distribute one large data object to a large number of receivers. This new protocol can also be deployed with or without support of IP multicast, and is not dependent on the network topology. In addition, this invention also addresses the problem of file synchronization.

SUMMARY OF THE INVENTION

This invention presents a method that delivers arbitrary data from a single source node, known as a server, to a large number of receivers using a novel method based on the selection of an active receiver. The active receiver selection is done using a novel token granting mechanism. In addition, the protocol introduces methods for efficiently transmitting and retransmitting data segments. The active receiver is responsible for providing flow control feedback to the server during data transfer as well as generating requests for retransmission. All receivers are offered a chance to become an active receiver in a controlled manner, and only one receiver can be an active receiver at any given time. This process continues until there are no receivers in the group with any missing segments. The second task of the protocol provides synchronization of the file version to ensure that all receivers have the last distributed version of the data file.

The inventive method eliminates the acknowledgment implosion problem associated with multicast transport protocols by making only one receiver responsible for generating acknowledgments and also requesting retransmissions. In addition, it provides flow control, avoids duplicate transmissions and makes effective use of unicast and multicast communication.

The invented method is especially suitable for networks where the server and receivers are connected through long delay media such as satellite links. None of the earlier disclosed mechanisms can work efficiently on satellite links as they depend on random time-outs at receivers. The current invention is also suitable for wide area networks with low latencies.

In addition to being independent of topology constraints, the invented method does not require support of IP multicast routing. It can work both in networks that support multicast routing and in those that do not yet support multicast routing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 14B is a logic diagram of the data distribution procedure for the file synchronization process.

DETAILED DESCRIPTION OF THE PREFERRED EMBODIMENT

Multicast distribution of data requires the presence of an underlying multicast delivery system that is capable of forwarding data from the sender to every receiver. There are two common methods to forward multicast packets in the data network: true multicast, IP multicast, and simulated multicast at the application layer.

In an IP multicast, file servers simply send the data packets to the receiving clients' multicast IP address without any advance knowledge of clients in the distribution group. A multicast IP address is a normal client IP address chosen from a reserved range of "class D" addresses. Utilizing this configuration, clients simply join the group at the multicast IP address to receive any data sent to the group. Group memberships are transparently managed by a Internet Group Management Protocol (IGMP) running on hosts and routers. When IP multicast is available, the network routers create a multicast routing tree so that a single packet is appropriately duplicated and forwarded by the router to all members of the group.

Figure 1:
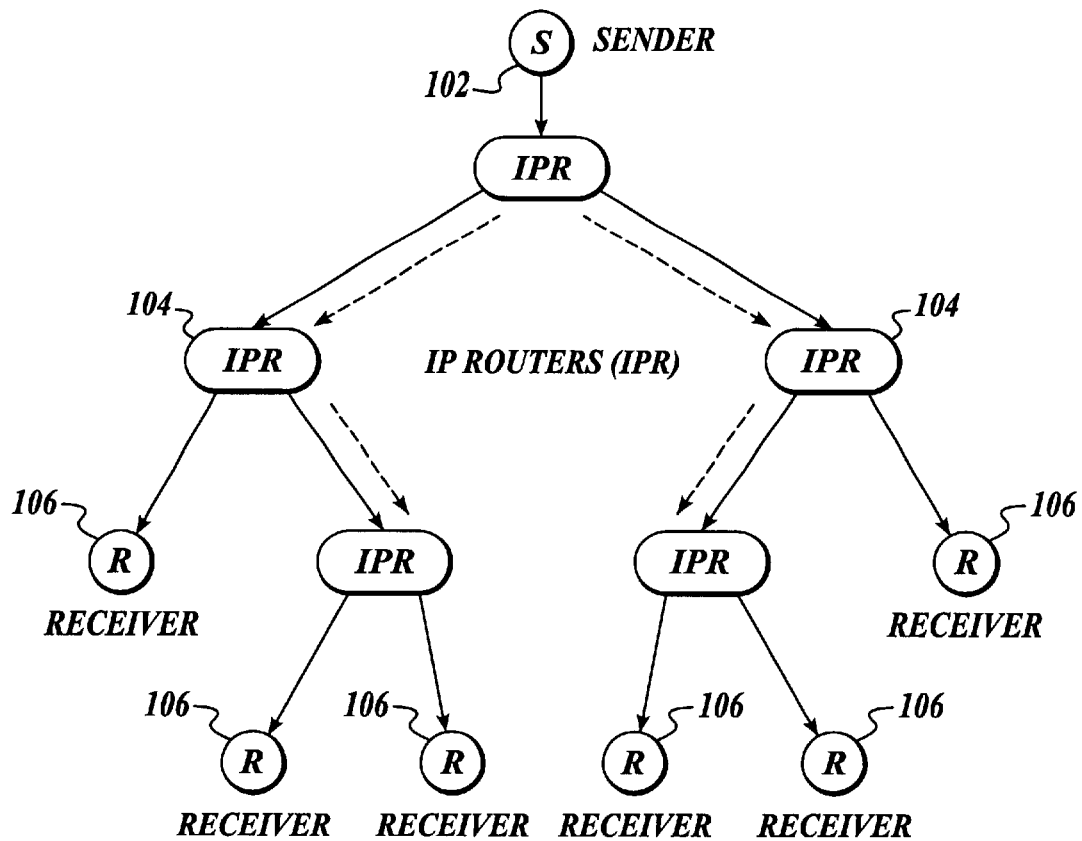
FIG. 1 is an illustration of a prior art multicast delivery system with IP multicast support.

FIG. 1 shows a prior art multicast delivery system when IP multicast support is available in the network. The dotted lines in the figure indicate the flow of multicast packets from the sender S 102 to the receivers R 106. Although IP multicast has existed for some time, there is very little deployment of IP multicast facilities in inter-networks for reasons beyond the scope of this disclosure.

Figure 2:
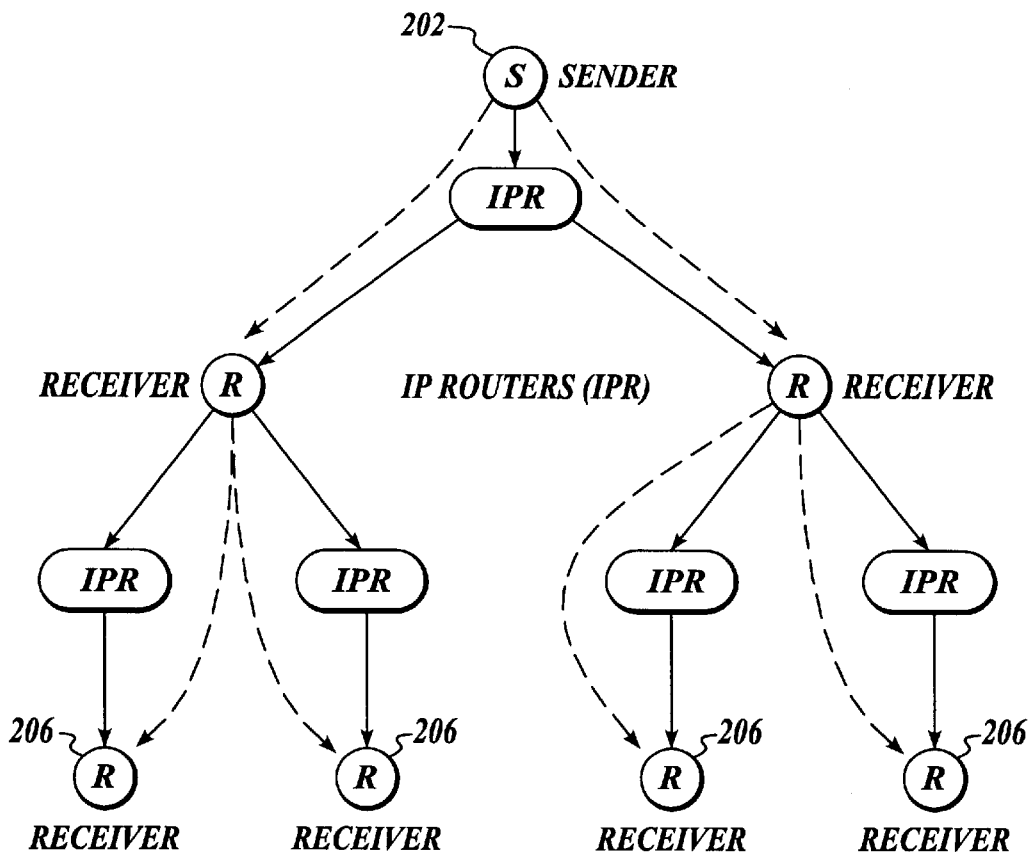
FIG. 2 is an illustration of a prior art multicast delivery system not utilizing IP multicast support.

Alternatively, simulated multicast must be used when true multicast routing support is not available. If the underlying infrastructure does not support true multicast, it is presumed a multicast tree would be created before the start of the multicast file distribution by a mechanism outside the scope of this protocol. A simple method is to configure manually a neighbor-forwarding list for the forwarding multicast traffic at each receiver. This information can also be distributed to each receiver by network management tools and protocols. FIG. 2 is an illustration of a prior art multicast delivery system when IP multicast support is not available by the network. The dotted lines indicate the flow of multicast packets from the sender S 202 to the receivers R 206.

Delivery of multicast traffic is affected by the network topology. The two common topologies include the tree and the star based-topology. In the tree topology, the multicast delivery system forms a multicast tree connecting the sender and the receivers, with the senders as the root node and the receivers as the leaf nodes. Data generated by the sender flows through the multicast tree, traversing each tree edge exactly once. If the network supports true multicast, the multicast routing tree at the routers is automatically reconfigured, whenever receivers join or leave a multicast group.

Figure 3:
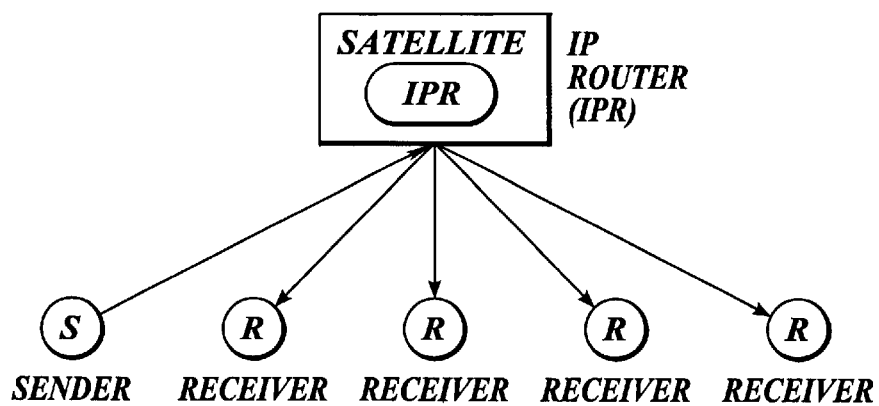
FIG. 3 is an illustration of a simple prior art star topology-based network.

If a satellite is used as the communication hub, the configuration of the network results in a star based-topology. The methods of the current invention require that the server takes cognizance of satellite based transmission. The server adjusts protocol behavior to accommodate long delay transmission paths and the broadcast nature of communication. FIG. 3 shows the resulting star topology in satellite based networks.

Group Management for Reliable Transport Protocols

All multicast applications require a mechanism for group management. A reliable multicast application may have explicit or implicit group management. Many multicast applications use implicit group management, where sources simply send to a multicast address and receivers join the same multicast address to receive data. This means that any receiver that joins the group is automatically accepted as a member of the group. In this approach, the complete receiver set is unknown to both the sender and individual receivers. This approach fits well with the way IP multicast works, and also with receiver based state management where the sender is not required to keep the state information for individual receivers. The implicit group management also removes from the sender the burden of tracking the join-in and sign-off of receivers.

For some applications such as file distribution, group membership may remain fixed throughout the session, and the necessary information about the receiver set may be pre-configured at the sender. If new receivers are added, a group management protocol, known as an explicit management of group membership, may be needed to handle reliable join-in and sign-off of members. In this case, group membership is monitored, and a new receiver may be required to inform the sender and sometimes other receivers, when it joins or leaves the group. When group membership is known to the sender, it is easy for a sender to determine when all receivers have received the data, and free the buffer. For example, a sender may poll all the receivers, or may use their sign-off from the group as indication of their completion. However, when group membership is non-deterministic, it cannot be positively determined whether all receivers were able to receive the multicast data. In this case, the sender must maintain the data for a long period of time and allow a receiver to update itself if it missed the multicast distribution session. The following methods address these issues of involving the management of group membership.

Method Overview

The method of the present invention is called the multicast file distribution and synchronization protocol (FDSP). This method is a receiver-initiated protocol in which each receiver, a FDSP client, is responsible for ensuring reliable delivery of the complete data from the source, the FDSP server. This novel method combines both negative and positive acknowledgment from the receivers.

Figure 4:
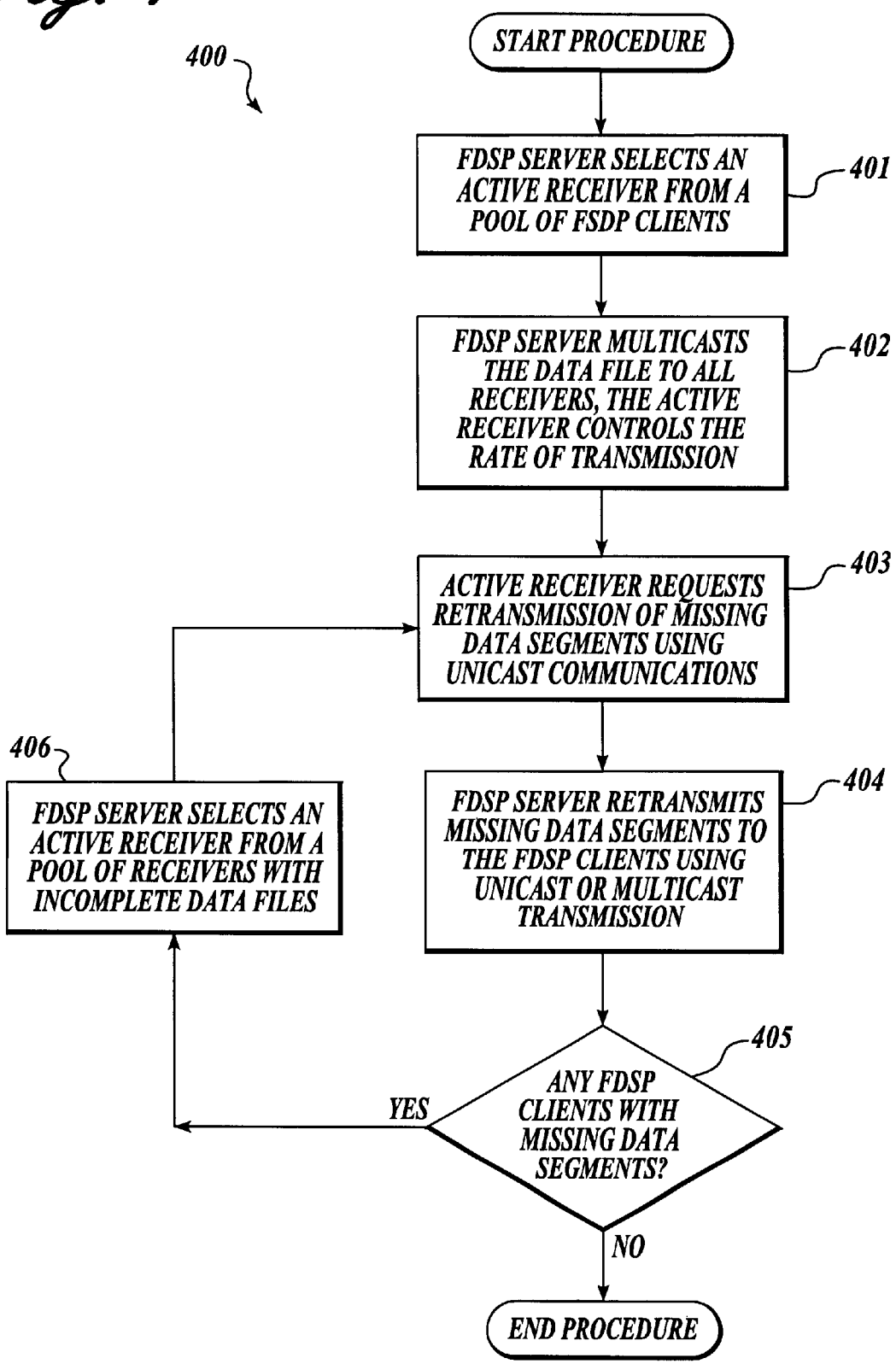
FIG. 4 is an overview of the logic implemented in the file distribution process.
Figure 5:
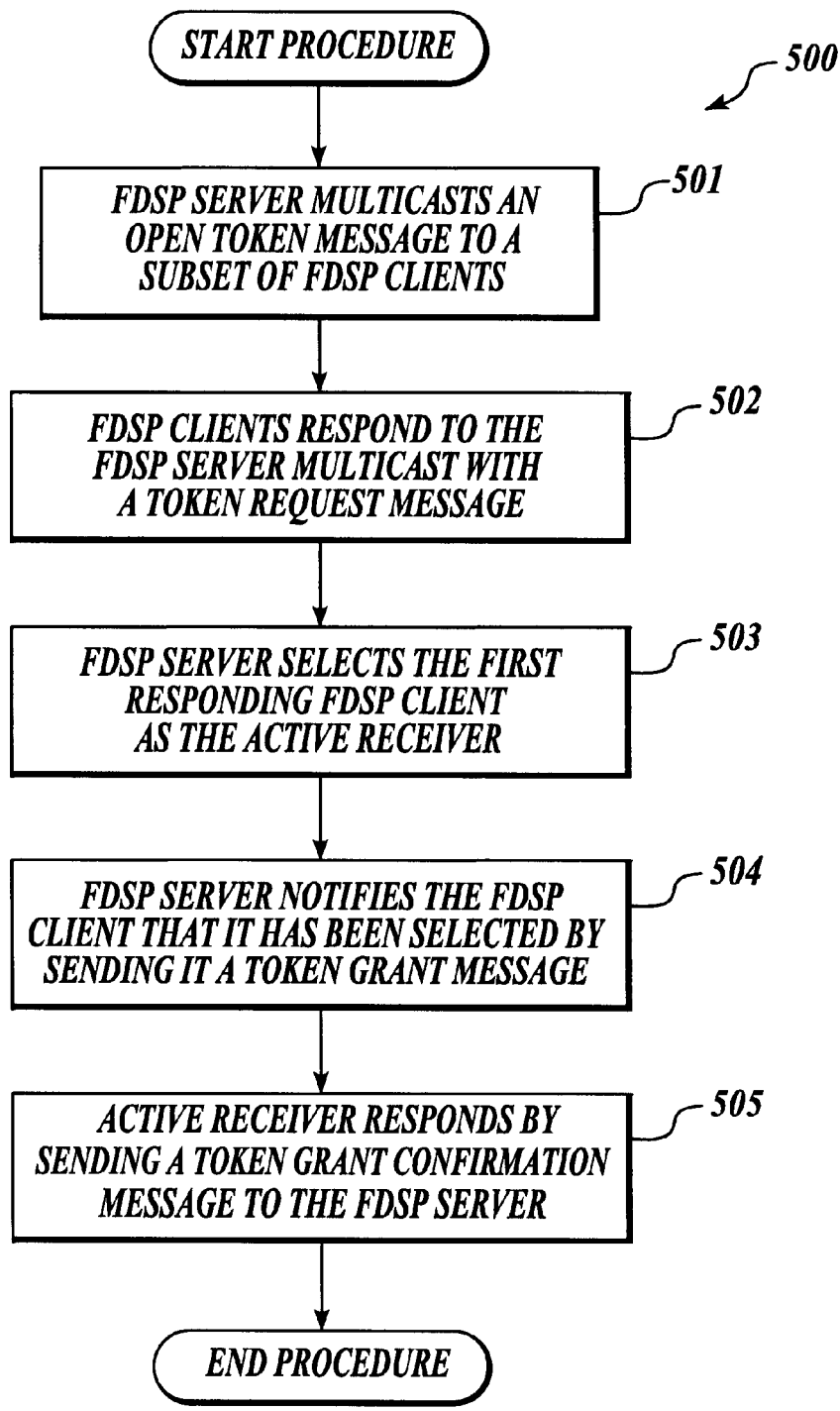
FIG. 5 is an overview of the logic implemented in the active receiver selection process.

As shown in FIG. 4, the FDSP file distribution process 400 starts at box 401 where the FDSP server selects one FDSP client as the active receiver. The active receiver selection process is explained in further detail in the description of FIGS. 5, 6 and 9. After selecting the active receiver, the logic continues in box 402 where FDSP server begins a multicast transmission of the data file. During the file distribution of box 402, the active receiver is responsible for controlling the data rate of the multicast transmission. This unique flow control mechanism provides feedback to the FDSP server so the file transmission rate does not exceed the optimal transmission rate of the network.

At the conclusion of the multicast transmission, the logic continues to box 403 where active receiver generates negative and positive acknowledgments to request retransmission of data packets lost in the first data transmission. Only one FDSP client is designated as the active receiver at any given time and thus it is the only FDSP client that is allowed to request retransmission of lost data packets from the FDSP server. Next, in box 404, the FDSP server responds to the retransmission requests by re-transmitting the missing data segments to the active receiver. In this stage of the process, the FDSP server may retransmit the data packets in unicast or multicast transmission. A multicast transmission is advantageous at this stage because all other FDSP clients are also set to receive data segments that they have not received.

Once the active receiver obtains all of the file data segments, the logic continues to box 405 where the FDSP server determines if there are any other FDSP clients with incomplete data files. If the FDSP server finds that there are more FDSP clients with incomplete data files, the process continues at box 406 where the FDSP server selects a new active receiver. From this point, the next active receiver can request data segments that it has not received. The process of boxes 403–406 continues until all FDSP clients receive all of the data segments from the data file transmitted in box 402. When all FDSP clients have the complete data file the process terminates until the next data file is sent from the FDSP server. This process is carried out each time the FDSP server needs to transmit a data file to multiple clients.

FDSP uses several messages during the operation illustrated in FIG. 4. Messages from the FDSP server are sent using both multicast and unicast distribution. Messages from FDSP clients are sent to the FDSP server using unicast only. FDSP uses two types of messages: data packets and control packets. Data packets carry actual data segments of the data file from the FDSP server. Control packets perform a variety of operations and are generated by the FDSP server as well as by FDSP clients. Some functions that require use of control packets include requests for retransmission, selection of an active receiver and FDSP file synchronization.

The following sections explain each box of FIG. 4 in further detail. In each summary it is assumed that all packets have a unique sequence identifier. In addition, it is to be assumed that the FDSP server ignores all duplicate control messages sent by the active receiver. Similarly, all FDSP clients ignore duplicate control or data packets from the FDSP server.

Selection of Active Receiver

As shown in box 401 of FIG. 4, the FDSP process starts when the FDSP server selects an active receiver. The process of box 401 is explained in further detail in FIG. 5, a logic diagram of the active receiver selection process 500.

The selection process begins at box 501 with a simple token granting mechanism to select one of the FDSP clients as the active receiver. In step 501, the FDSP server multicasts an Open Token message directed to a subset of FDSP clients. The Open Token should be transmitted to a limited group of clients, where the entire group of clients is divided into several logical subsets. This limitation allows only one subset of FDSP clients to respond to an Open Token message. It is suggested that each subset of FDSP clients consist of a small number of receivers, e.g. less than 20. Detailed descriptions of the methods for dividing the FDSP client group into smaller subsets are included in the description of FIGS. 6 and 9.

Next, in box 502, all FDSP clients that receive the Open Token message respond with a Token Request message. When the FDSP server receives the client Token Request messages from the responding FDSP clients, the logic proceeds to box 503 where the FDSP server selects the first responding FDSP client as the active receiver. The first responding FDSP client is selected as it is deemed to be the closest device to the FDSP server. The objective of this process is to select the FDSP client with the shortest delay since this node is in the best position to provide quick feedback to the receiver during the data transfer phase. The process then proceeds to box 504 when the FDSP server sends a Token Grant message to the active receiver. This notifies that FDSP client that it has been selected as the active receiver. The selection process then after box 505, where the active receiver sends a Token Grant confirmation back to the FDSP server.

The active receiver selection process 500 can be carried out in two different ways depending on the topology of the network. One embodiment involves a process to select an active receiver in a tree topology-based network and second embodiment involves a process to select an active receiver in a star topology-based network.

Figure 6:
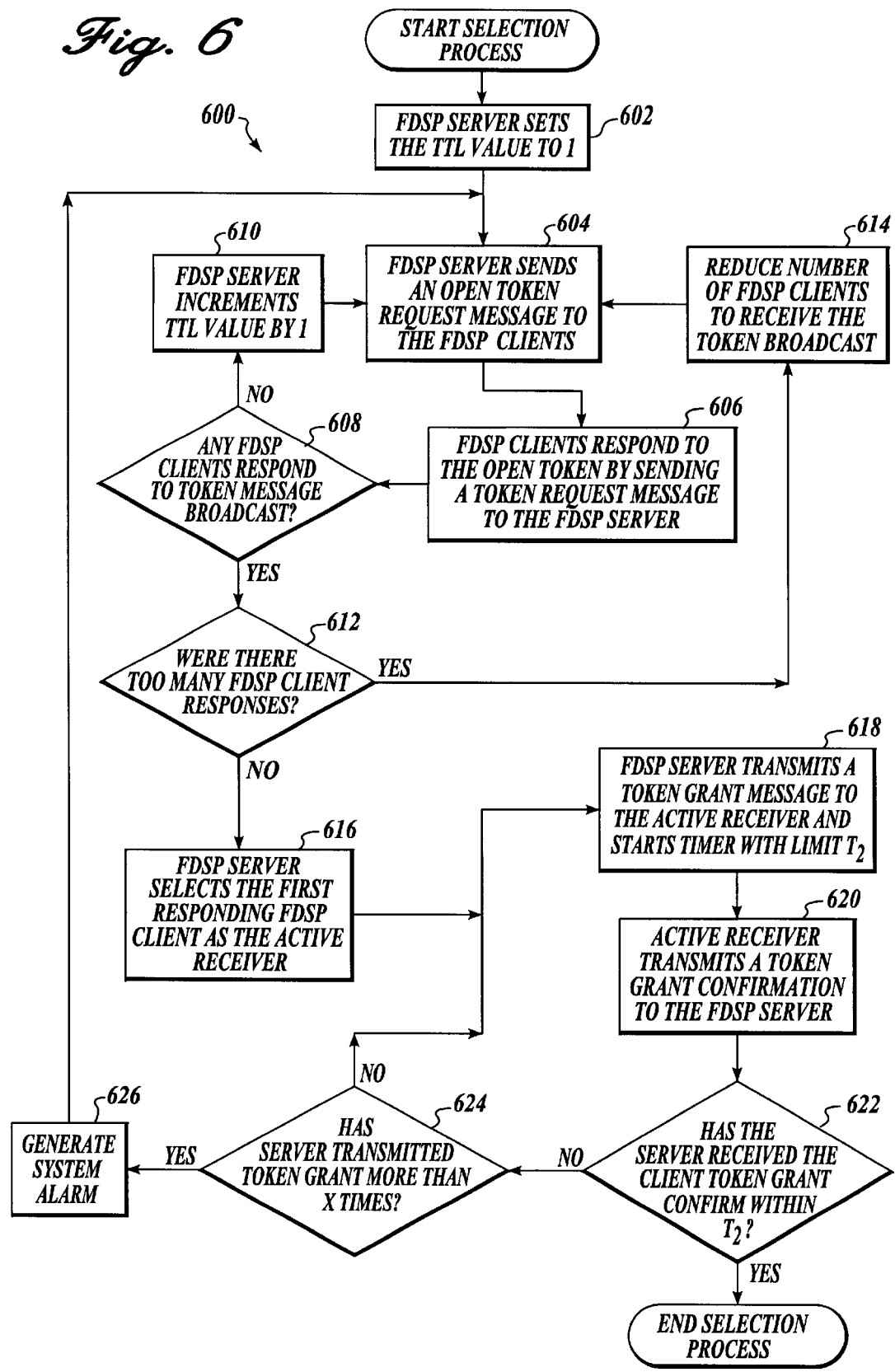
FIG. 6 is a detailed logic diagram of the active receiver selection process for a tree topology-based network.

FIG. 6 is a logic diagram of the first embodiment of the selection process, the selection process for a tree topology-based network 600. The diagram in FIG. 6 is described below as the logic is applied to the network 710 in FIG. 7. In this embodiment, the FDSP server 720 controls the number of FDSP clients 722, 724, 726, and 728 that will receive the Open Token message 738 by adjusting the value of the Time-to-Live (TTL) field in the IP header of the packet. As known in the art, the TTL value in an IP header determines the length of time that particular packet transmits through a network. Once the time period set in the TTL field expires for that individual packet, the transmission of that particular packet terminates. The use of the TTL field is one method of selecting a smaller subset of clients out of the entire client group. As shown in box 602, it is preferred that the first Open Token message 738 is sent with the TTL value of 1. After the TTL value is set, the FDSP server 720 sends the first Open Token message 738, as shown in box 604.

The process then proceeds to box 606 where the FDSP clients 722, 724, 726, and 728 respond to the Open Token message 738 by transmitting a Token Request messages 740, 742, and 744 back to the FDSP server 720. FDSP clients 722, 724, 726, and 728 respond to the Open Token message 738 only if they are missing data segments. The logic then continues to decision box 608 where the FDSP server 720 determines if it has received at least one Token Request message within a time-out period. In the preferred embodiment, the time-out period is predetermined and can be for a tree based network, for example, equal to: 0.2 seconds+TTL Count*0.1 seconds. Thus, for a TTL Count of 1, the time-out period is 0.3 seconds. In general, all timers should be doubled at the next try to avoid the response from being delayed due to temporary congestion in the network. In addition, the timer values are configurable and adjusted for the network topologies and link speeds.

If the FDSP server 720 does not receive a response, the logic continues to box 610 where the FDSP server 720 increases the TTL value before the Open Token message 738 is resent in box 604. In box 610, the TTL value is should be increased by 1 but this value could be incremented by any other number depending on the network topology and the depth of the tree. The logic in boxes 604–610 repeats until the FDSP server 720 receives at least one Token Request message from a FDSP client or until the TTL reaches a given maximum value.

When the FDSP server 720 receives at least one responding FDSP client at decision box 608, the logic continues to box 612 where the FDSP server 720 determines if the number of responding FDSP clients is too high. A suggested above, the scope of the broadcast should reduce the number of receiving FDSP clients to approximately twenty. If the FDSP server 720 finds that there are too many responding FDSP clients, the logic continues to box 614 where the FDSP server reduces the scope of the Open Token message 738, thereby reducing the number of recipients, before the Open Token message 738 before it is resent in box 604. The mechanism for reducing the number of receiving FDSP clients is further explained below in the description of the logic diagram in FIG. 9. This mechanism allows the FDSP server to reduce the number of receiving FDSP clients that are the same TTL length from the FDSP server by the use of a base number and a matching number in the Open Token message.

Figure 7:
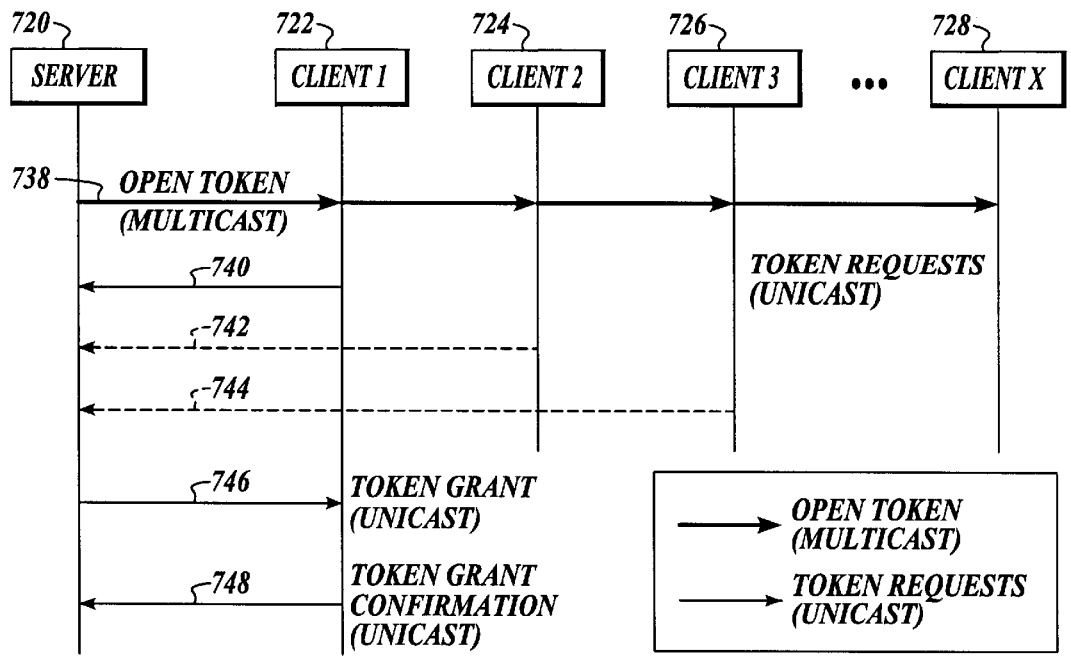
FIG. 7 is a diagram of a simple tree topology-based network having a server and a plurality of receiving clients.

If the FDSP server 720 does not detect too many FDSP client responses in box 612, the logic continues to box 616 where the FDSP server 720 selects the first responding FDSP client as the active receiver. In FIG. 7, the first responding FDSP client is "Client 1" 722, thus it is now the active receiver. The logic then proceeds to box 618 where the FDSP server 720 notifies the active receiver 722 of its selection by transmitting a Token Grant message 746 back to the active receiver 722. When the Token Grant 746 message is sent, the FDSP server 720 also starts a timer with a limit of $T_2$. The timer on the FDSP server 720 measures the response time of the active receiver. When the active receiver 722 receives the Token Grant message 746 from the FDSP server 720, it responds by sending a Token Grant Confirmation message 748 back to the FDSP server 720.

Next, at box 622, the FDSP server 720 then determines if it has received the active receiver's Token Grant Confirmation message 748 within the time limit of $T_2$. If the FDSP server 720 detects that the active receiver 722 has responded within the $T_2$ time limit, the FDSP server 720 terminates the active receiver selection process 600 and prepares to execute the data distribution process depicted in box 402 of FIG. 4.

However, if the FDSP server 720 does not receive the client Token Grant Confirmation message 748 within the time limit of $T_2$, the logic continues to boxes 624, 618, 620 and back to 622, where the FDSP server 720 repeats the Token Grant transmission. This loop continues until the FDSP server 720 receives a Token Grant Confirmation message 748 from the active receiver 722 within the $T_2$ time limit or until the FDSP server 720 has sent the Token Grant message 746 to the active receiver more than X times. In this type of network, the value for the maximum number of Token Grant messages, X, should be approximately three. If it is found at decision box 624 that the FDSP server 720 has sent the Token Grant message 746 more than X times, the logic proceeds to box 626 where FDSP server 720 generates an alarm. At this point, it is assumed that the current active receiver has failed and the process continues back to box 604 where the FDSP server 720 broadcasts another Open Token message to select a different active receiver.

When the FDSP server selects an alternate active receiver, the Open Token message is sent to all FDSP clients with the same scope as the last successful Open Token message. More specifically, this means that the Open Token message maintains the same TTL value and the same scope parameters as the last successful Open Token message. The Open Token message scope parameters are described below in the description of FIG. 9.

The time limit, $T_2$, used in box 622 is calculated from the round trip time (RTT) measured during the selection process. More specifically, the FDSP server measures the time duration from the transmission of the Open Token message 738 to the receipt of the client Token Request 740 to measure the RTT. Also during the selection process, the active receiver 722 also computes the RTT to the FDSP server 720 by measuring the delay between sending the Token Request message 740 and receiving the Token Grant message 746 from the FDSP server. The recommended value for the time limit, $T_2$, is two times the RTT from the FDSP server 720 to the active receiver 722.

Figure 8:
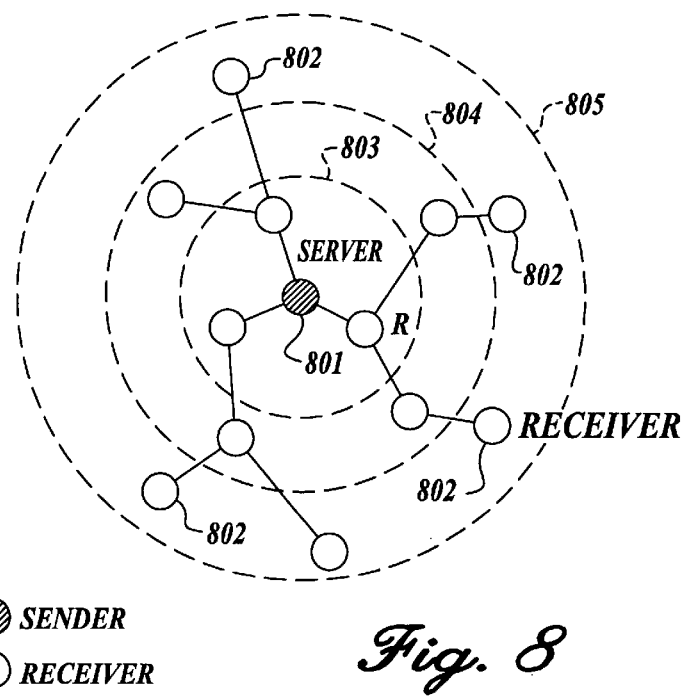
FIG. 8 illustrates a model of a tree topology-based network.

FIG. 8 illustrates another model of a tree topology-based network. This model divides the network into a plurality of concentric circles 803-805 with a fixed center node as the FDSP server 801. Each circle defines a boundary, or scope, of a transmission and the TTL value is used in the selection process to control the scope of the broadcast. Each time the TTL value is increased, the FDSP server 801 increases the number of receiving FDSP clients 802 by allowing the packet to transmit to the outer circles 804 and 805. This expandable scope control is inherently robust because any receiving node 802 that fails to receive an Open Token message during one transmission has another opportunity to receive the message during the next transmission after the TTL value has increased.

If the network does not support true IP multicast, the FDSP server maintains the TTL value in the Open Token packet itself (instead of relying on the TTL value in the iP packet header) to broaden the transmission scope. Instead, each intermediate FDSP client decrements the TTL value in each packet before forwarding the packet to the next node in the distribution tree.

Figure 9:
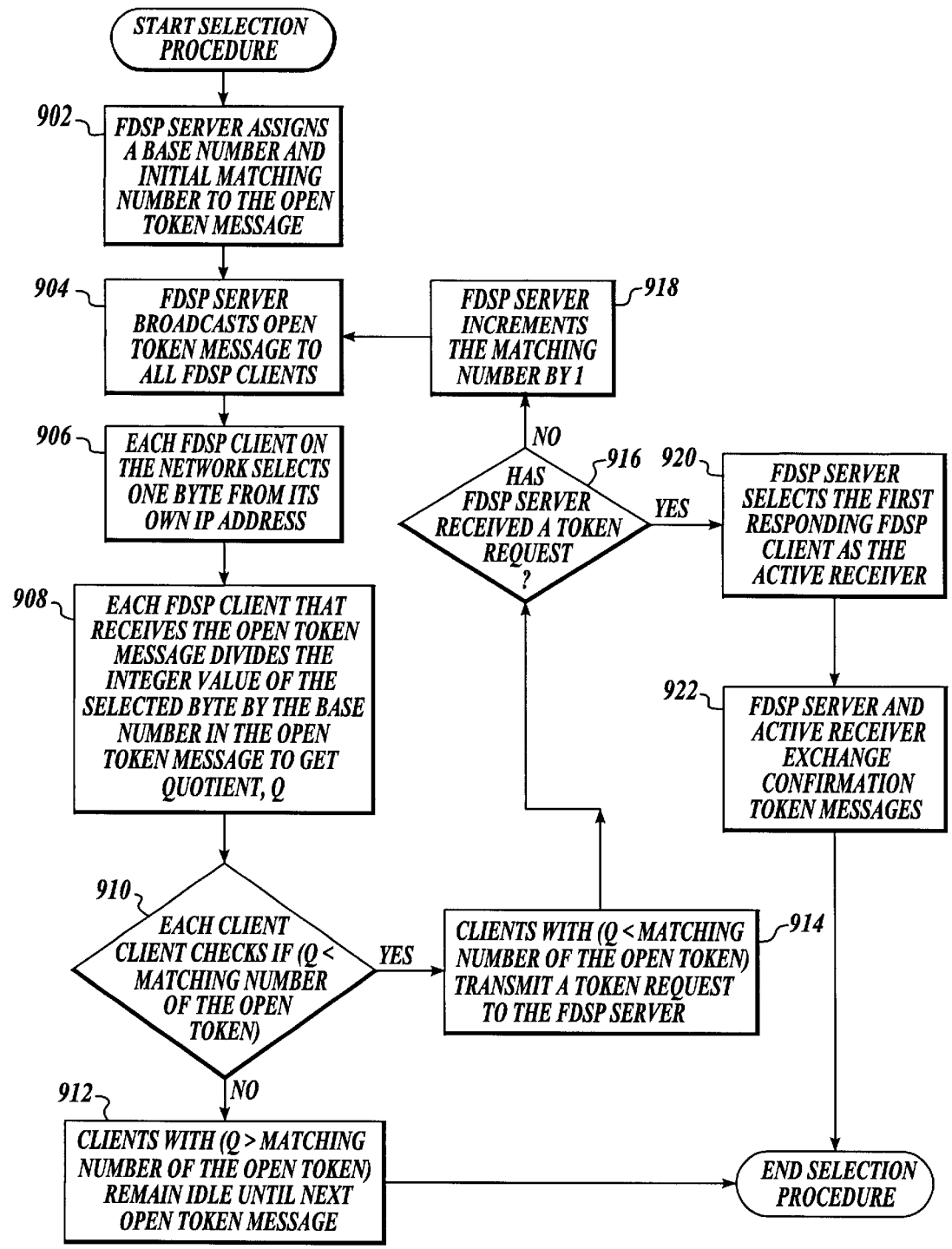
FIG. 9 is a detailed logic diagram of the active receiver selection process for a star topology-based network.

FIG. 9 is a logic diagram of the second embodiment of the selection process, the selection process for a star topology-based network 900. In this embodiment, the FDSP server controls the number of FDSP clients that will receive the Open Token message by the use of a novel process that dynamically changes the number of responding FDSP clients from the Open Token broadcast.

The selection process for a star topology-based network 900 starts at box 902 where the FDSP server designates a base number and a matching number in the packet header of the Open Token message. The Open Token message also specifies which byte to use for the computation. Therefore, as seen below, all receivers will use the same byte from their IP address for the required computation. Next, in box 904, the FDSP server sends the Open Token message via a multicast transmission to every FDSP client on the network. Since all FDSP clients receive the Open Token message, each FDSP client must execute a mechanism to reduce the number of FDSP clients that respond to the FDSP server.

Boxes 906–914 show the process executed on each FDSP client to determine if it will respond to the FDSP server. At box 906, each FDSP client selects the predetermined byte from its own IP address dictated by the Open Token message. Next, in box 908, as the FDSP clients receive the Open Token message, each client divides the integer value of its selected byte by the base number in the Open Token message. This division produces a quotient, Q. The logic then continues to box 910 where each FDSP client compares the quotient, Q, with the matching number in the Open Token message. As shown in box 914, each FDSP client with a quotient result less than the matching number in the Open Token message sends a Token Request message back to the FDSP server. Conversely, as shown in box 912, each FDSP client with a quotient greater than the matching number terminates the selection process until the next Open Token message is sent from the FDSP server.

Figure 10:
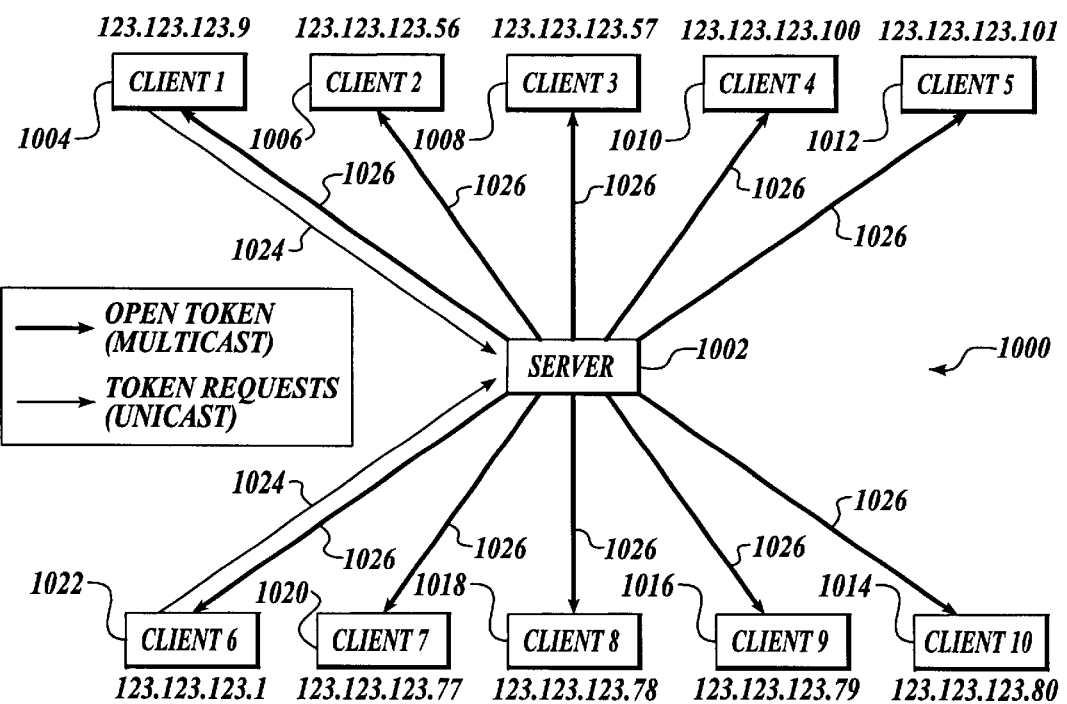
FIG. 10 is a diagram of a small star topology-based network.

FIG. 10 depicts a diagram of a small star network 1000 and how the selection process of FIG. 9 is applied to the network 1000. In this example, the FDSP server 1002 broadcasts an Open Token message 1026 with a base number of 10 and a matching number of 1. If the FDSP clients select the fourth byte of an IP address, then only FDSP clients having a value of 1 to 9 for the fourth byte in their IP address are allowed to respond to the server. In this diagram, Client 1 1004 and Client 6 1022 are the only clients to return a Token Request message as Client 1 1004 and Client 6 1022 are the only clients with a Q of 0, less than the matching number of 1. In sum, the base number determines the size of logical groups selected from the entire pool of FDSP clients. The use of the base number also allows the FDSP server to select the approximate size of each logical group such that each group contains no more than a reasonable number of receivers. In addition, the matching number allows the FDSP server to dynamically control the scope of the Open Token broadcast each time the Open Token is transmitted.

Returning to FIG. 9, if the FDSP client responds to the FDSP server in box 914, the logic continues to box 916 where the FDSP server determines if it has received at least one Token Request message within a fixed time-out period. This fixed time-out period $T_2$ can be, for example, about 3 seconds. If no FDSP client responds to Open Token message, the process continues to box 918 where the FDSP server increments the matching number by 1. The Open Token message is then rebroadcasted in box 904 with the new matching number. The process in boxes 904–918 repeats until the FDSP server receives at least one Token Request message from a FDSP client or until the matching number exceeds a designated maximum allowed value. When the server receives a Token Request message from a FDSP client at box 916, the logic proceeds to box 920 where the server selects the first responding FDSP client as the active receiver. The selection process concludes after the FDSP server and active receiver exchange token messages to confirm the selection of the active receiver. The token exchange process of box 922 is similar to the process described in boxes 618 through 626 shown in FIG. 6 using the time limit of $T_2$.

The scope control method depicted in FIG. 9 can be used to reduce the number of responding FDSP clients. Here, the FDSP server essentially subdivides the logical groups of FDSP clients by decrementing the matching number in the Open Token message if too many FDSP clients respond at box 916. This may be desired when the selection method is applied to large star networks.

As mentioned above, the scope control method depicted in FIG. 9 may be applied to the selection process for a tree topology-based network 600. This control mechanism is effective for tree networks because it has the ability to reduce the number of responding FDSP clients even if the clients are at the same TTL length from the FDSP server. Thus, box 614 of FIG. 6 would decrement the matching number in the Open Token message before the multicast transmission in box 604.

Distribution of Data

Figure 11:
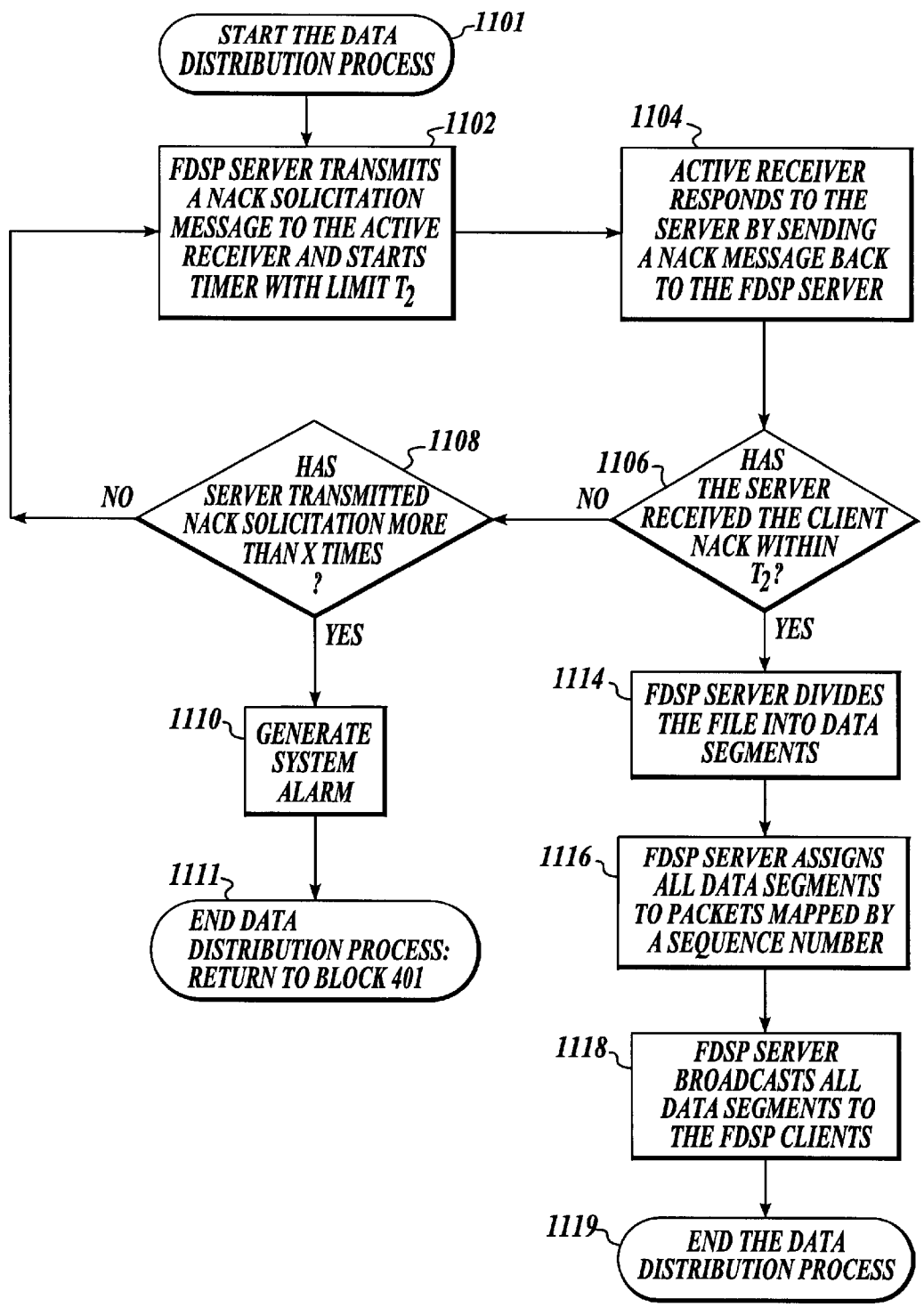
FIG. 11 is a detailed logic diagram of the data distribution process.

As shown in FIGS. 4 and 6, after the FDSP server receives the Token Grant Confirmation message in the selection process, the FDSP server then starts the data distribution process shown in box 402. The process of box 402 is explained in further detail in FIG. 11. FIG. 11 is a logic diagram of the data distribution process 1100.

The data distribution process 1100 starts in box 1102 when the FDSP server sends a unicast NACK Solicitation message to prepare the active receiver for data distribution. The NACK Solicitation message communicates the file size information to the active receiver. Then in box 1104, the active receiver responds by sending a NACK message to request specific segments of the data file required by the active receiver. If the file is being distributed for the first time, the active receiver requests all segments of the data file. A detailed description of the NACK message format is explained in the description of box 1206 of FIG. 12.

The loss of NACK solicitation is handled in the same way as the loss of a Token Grant message in boxes 618–626 shown in FIG. 6. As shown in box 1106 of FIG. 11, if the server does not receive a NACK from the active receiver within a time-out period of $T_2$, the FDSP server resends the NACK Solicitation message. As shown in boxes 1108–1110, if the NACK solicitation has been transmitted more than X times, the FDSP server generates an alarm and terminates the data distribution process 1100. At this point, the process returns to box 401 of FIG. 4 where the FDSP server selects another active receiver.

However, if the FDSP server receives the NACK from the active receiver within the time-out period, $T_2$, the logic proceeds to box 1114 where the FDSP server divides the data file into smaller data segments. Here, the FDSP server should divide the data segments into fixed, equally sized segments except for the last data segment. The FDSP server also marks the last data segment with a End-of-File (EOF) attribute. The data segments should not be divided into segments larger than 1024 bytes.

Next, in box 1116, the FDSP server assigns all data segments to sequentially numbered data packets. In this stage, the FDSP server maps all of the data packets with the sequence number starting at 0. Then in box 1118, the data segments are distributed by a multicast signal to all FDSP clients.

To properly execute the data distribution process all clients must have enough buffer memory to receive the data segments in any order and still have the ability to reconstruct the data file from all of the data segments. Similarly, it is necessary for the FDSP server to keep its data intact as long as a receiver request is pending to update it. FDSP clients that do not have a sufficient amount of memory to store the incoming data segments should terminate the distribution process and generate an alarm.

During the data distribution process, it is assumed that each data file in the FDSP server has a name or a unique file identifier that maps that data file to a particular data file in all of the receiving clients. In addition, each distributed data file is identified with a unique version number. The FDSP server increases the version number of a file by 1 every time the server distributes new data for that particular data file. The file version number is reset to zero after the version number reaches a maximum value, e.g. a maximum value of 16383 is reset to 0.

Handling Retransmissions and Node Failures

Figure 12A:
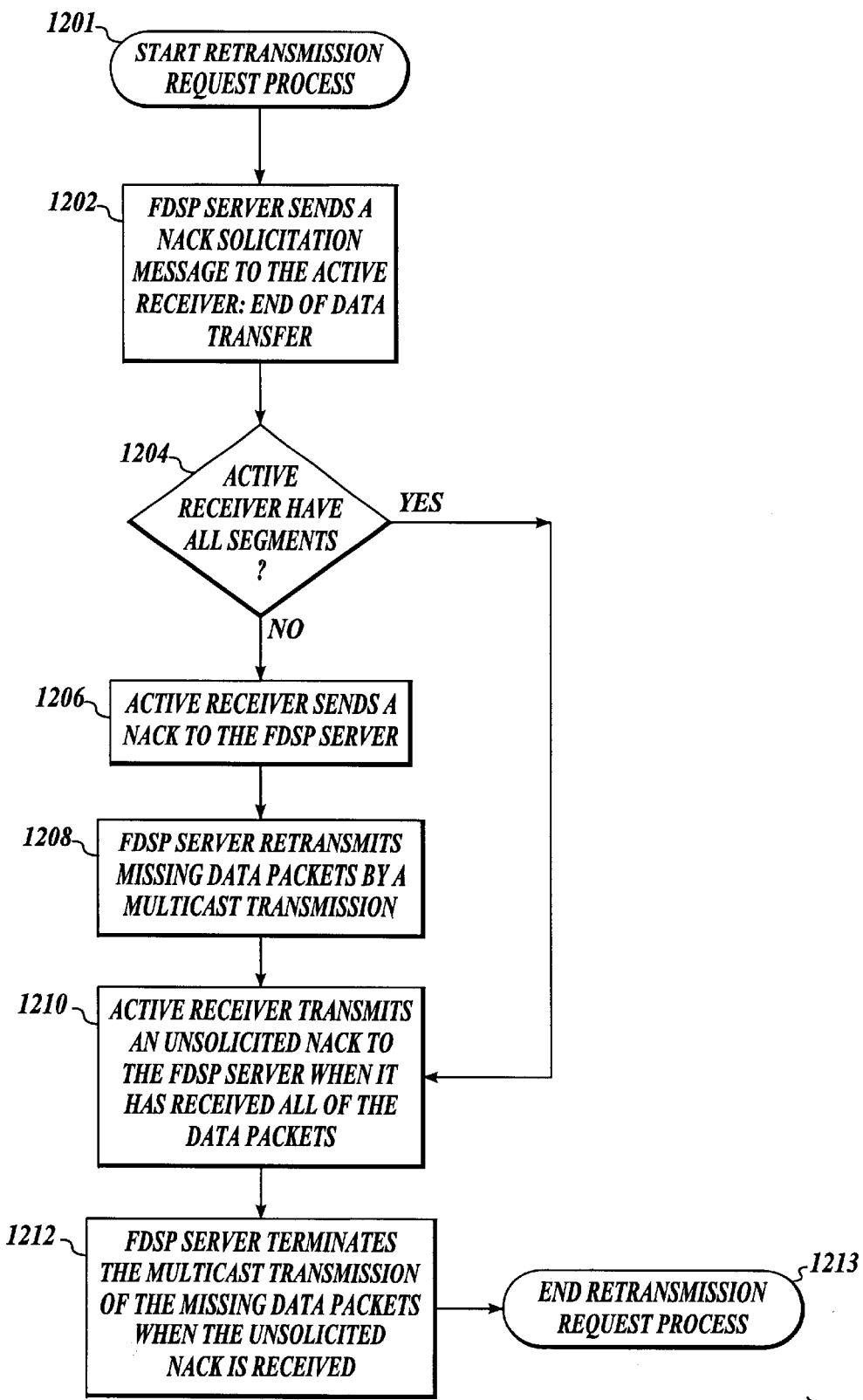
FIG. 12A is a detailed logic diagram of the data retransmission request process.

As shown in FIG. 4, after the FDSP server distributes the data file in box 402, the active receiver requests a retransmission of the data segments not yet received by that FDSP client. The processes of boxes 403 and 404 are explained in further detail in FIG. 12A. FIG. 12A is a logic diagram of the data retransmission process 1200.

The data retransmission process 1200 provides reliable delivery of the data file by selectively re-sending lost data segments after all of the segments have been sent in the data distribution process 1100. The data retransmission process 1200 uses NACK solicitation messages and NACK messages to control the transmission of the data packets.

The data retransmission process 1200 starts at box 1202 where the FDSP server sends a NACK solicitation to the active receiver. This NACK solicitation is only sent after all data segments are transmitted in the data distribution process 1100. As shown in box 1204, the receipt of the NACK solicitation message triggers the active receiver to determine if it missed any data segments during the data distribution process 1100. If the active receiver detects that it has received all data segments of the file, the process continues to box 1210 where the active receiver transmits an unsolicited NACK to notify the FDSP server it has completed the data transmission. At this point, the FDSP server assumes the token has been released from the active receiver and the logic continues to box 405 depicted in FIG. 4 where the FDSP server determines if it needs to select another active receiver.

However, at box 1204, if the active receiver detects that it has not received all segments of the data file, the logic proceeds to box 1206 where the active receiver sends a NACK to the FDSP server. The NACK sent by the active receiver is used to request the retransmission of packets lost during the data redistribution process 1200. Here, the NACK's are only sent from the active receiver, as the active receiver is not responsible for any retransmission requests for other receivers.

The NACK message sent in box 1206 includes a data segment number N and a bitmap B. The segment number N indicates the number of packets that have been correctly received by the active receiver and the bitmap B indicates whether specific packets beyond N have been received or lost. Specifically, a 0-bit in the bitmap corresponds to a lost, or incorrectly received, packet and a 1-bit corresponds to a correctly received packet. For example, an NACK with N=500 and B=01101111 means that the receiver has correctly received all packets up to sequence number 500 and has requested retransmission of packets 501 and 504.

The maximum length of a bitmap in a particular NACK message depends on the implementation. A bitmap length of 512 bytes allows a receiver to send a cumulative acknowledgment of up to 4096 segments. The active receiver can choose to retransmit its NACK's for requesting retransmission in multiple packets with smaller bitmap fields or in a big packet with a large bitmap field. By this method, an active receiver can choose the most optimum way to request retransmission by dynamically adjusting the size of the bitmap field.

Returning to FIG. 12A, the logic continues at box 1208 where the FDSP server processes the data in the NACK sent from the active receiver and re-transmits the specified data packets. The transmission of box 1208 should be a multicast data transfer as each FDSP client is set to receive data packets not yet received by that particular FDSP client. The retransmission of the missing data packets continues until all data segments of the file are received by the active receiver. As shown in box 1210, when the active receiver detects that it has received all of the missing data segments, the active receiver sends an unsolicited NACK to the FDSP server. Once the active receiver sends the unsolicited NACK that particular FDSP client ignores all other Open Token messages and subsequent data retransmissions until the FDSP server transmits a new data file. Also, the active receiver does not retransmit any unsolicited messages; so there is no impact on the active receiver if the FDSP server fails.

The unsolicited NACK sent in box 1210, also known as a token release message, is essentially a NACK message with the "DONE" Flag raised. When the FDSP server receives the unsolicited NACK at box 1212, the FDSP server terminates the data retransmission process 1200. At this point, the FDSP server assumes the token has been released from the active receiver and the logic continues to box 405 depicted in FIG. 4 where the FDSP server determines if it needs to select another active receiver.

Figure 12B:
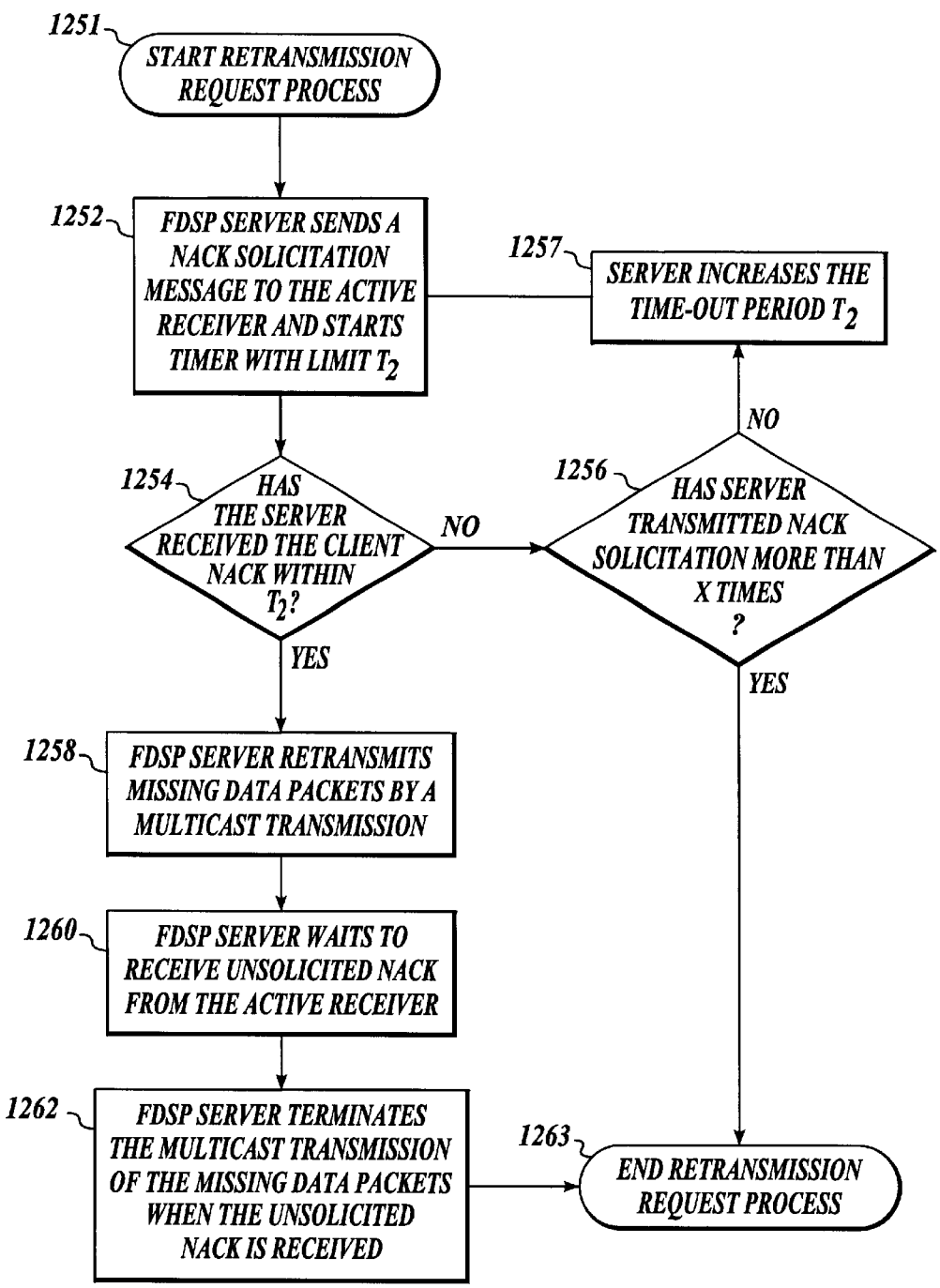
FIG. 12B is a detailed logic diagram of the data retransmission request process as the process is run on the data server.

FDSP also addresses the problem of lost NACK or NACK solicitation messages during the data retransmission process 1200. FIG. 12B is a logic diagram of the data retransmission process 1200 employing a recovery mechanism 1250 that is only executed by the FDSP server. In this procedure, lost NACK messages are handled in the same way as the loss of a Token Grant message using a time-out period.

The process begins at box 1252 where the FDSP server starts a timer with a time limit of $T_2$. In relation to FIG. 12A, the timer is started when the NACK solicitation message is sent in box 1202. As shown in box 1254, the FDSP server waits for a response NACK from the active receiver and determines if it has received the NACK within a time limit of $T_2$.

If the FDSP server receives a NACK from the active receiver within the time limit of $T_2$, the redistribution process continues the same process as illustrated in FIG. 12A. As shown in boxes 1258–1262, the FDSP server re-transmits the lost data packets to the active receiver until the FDSP server receives an unsolicited NACK message. At this point, the FDSP server assumes the token has been released and the logic continues to box 405 depicted in FIG. 4 where the FDSP server determines if it needs to select another active receiver.

However, at box 1254, if the FDSP server does not receive a NACK from the active receiver within the time limit of $T_2$, the process continues to decision box 1256 where the FDSP server determines if it has re-transmitted the NACK solicitation more than a maximum, X, times. If the FDSP server has not transmitted the NACK solicitation message more than X times, the FDSP server resends the NACK solicitation to the active receiver using a unicast transmission with an increased timeout period $T_2$. As shown in box 1257, each time the FDSP server resends the NACK solicitation, the time limit, $T_2$, is multiplied by a factor of two. Thus, $T_2$ increases each time the NACK solicitation is resent.

If the FDSP server has sent the NACK solicitation X times, the FDSP server terminates the data retransmission process 1200. As described above, the process continues from box 1263 to box 405 depicted in FIG. 4 where the FDSP server determines if it needs to select another active receiver.

As explained in the description of FIG. 6, the suggested time-out period, $T_2$, is twice the duration of the RTT time measured in the selection process 600. For the tree topology-based network, the time-out period in this procedure should be limited to a reasonable maximum number of seconds. In practice, this may be on the order of 4 seconds. The time-out period, $T_2$, in the star topology-based network should be limited to the initial value of twice the duration of the RTT.

The data retransmission process 1200 allows the active receiver to efficiently retransmit lost data. In addition, this mechanism allows an active receiver to stop the process if there is continual packet loss. If the active receiver does not have the complete file after an attempt to request a retransmission, that particular FDSP client will again become an active receiver after other FDSP clients request for data retransmission. Thus, there will be no impact on the FDSP server even if the active receiver completely fails.

Selecting Additional Active Receivers

Figure 13:
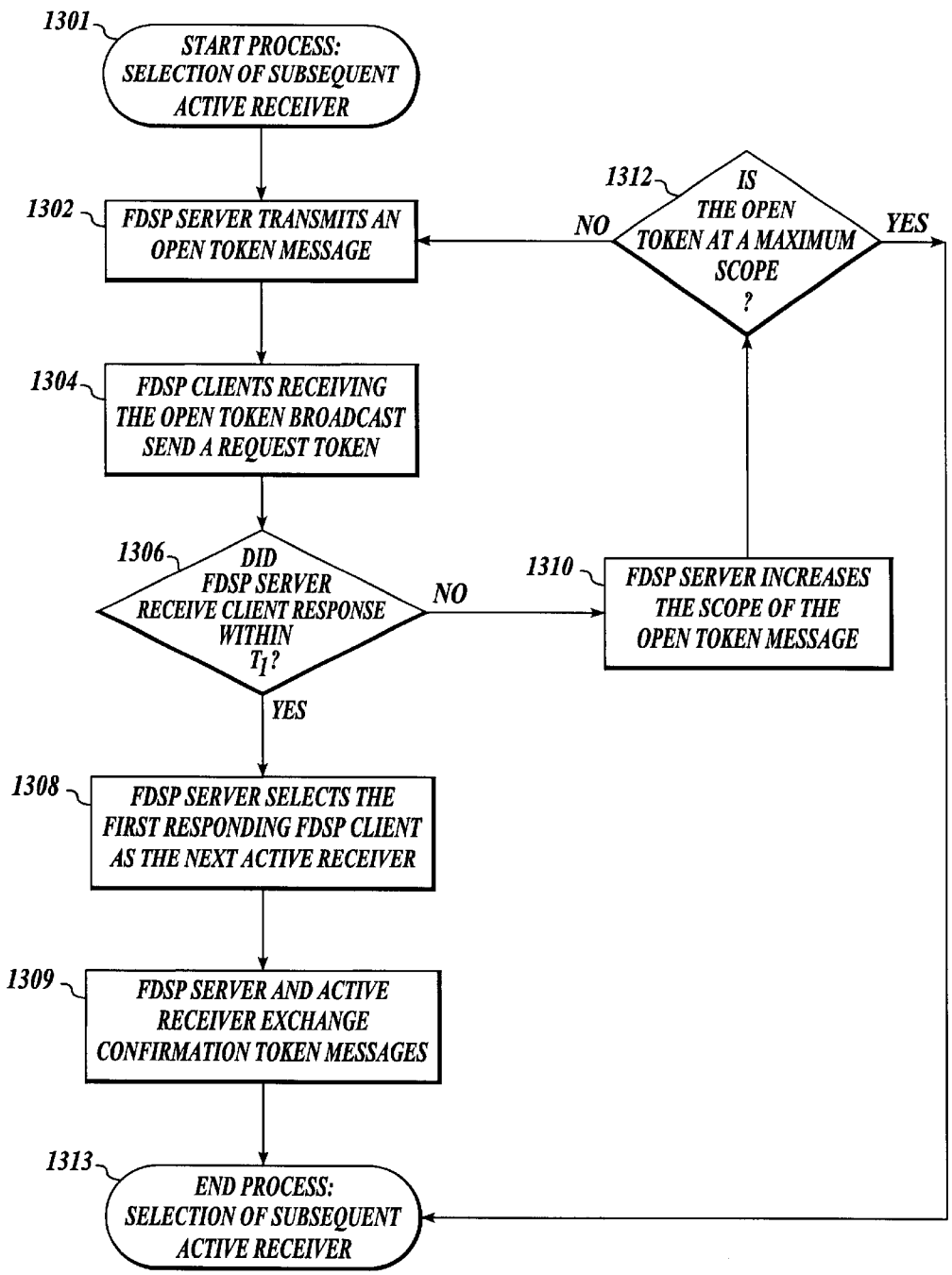
FIG. 13 is a detailed logic diagram of the selection process for subsequent active receivers.

As shown in FIG. 4, once the first active receiver acknowledges that it has received all segments of the file, the FDSP server searches for subsequent FDSP clients with missing data segments to be selected as the next active receiver. FIG. 13 further describes the process of searching for subsequent active receivers 1300 shown at box 405 of FIG. 4.

The process starts in box 1302 where the FDSP server broadcasts an Open Token message to the FDSP clients. This Open Token message has the same broadcast scope as the last Open Token message sent to the previous active receiver. Specifically, the Open Token message transmitted at box 1302 has the same base number and matching number as the last Open Token message sent to the previous active receiver. Next, in box 1304, FDSP clients receiving the Open Token message respond by sending a Token Request message back to the FDSP server. In this step, a FDSP client only respond with a Token Request message if it is missing at least one data packet.

The process then continues in decision box 1306, where the FDSP server determines if it has received a FDSP client Token Request message within a time-out period, $T_1$. The time-out period, $T_1$, is calculated by:

$T_1$=The initial value of $T_1$+2*(the RTT of the previous active receiver).

If the FDSP server receives at least one FDSP client Token Request message within the time-out period, $T_1$, the logic continues at box 1308 where the FDSP server selects the first responding FDSP client as the next active receiver. Next, in box 1309, the FDSP server exchange Confirmation Token messages with the new active receiver. This token exchange is similar to the process described in boxes 618 through 626 shown in FIG. 6 using the time limit of $T_2$. At this point, the process of searching for subsequent active receivers 1300 terminates. The logic then proceeds back to the data retransmission process of box 402, as shown in FIG. 4. The initial value of $T_1$ may be as calculated above.

However, at decision box 1306, if the FDSP server does not receive at least one Token Grant message within the time-out period, $T_1$, the logic continues to box 1310 where the FDSP server increases the scope of the Open Token message. As described above, this part of the process involves increasing the number of potential receiving FDSP clients by increasing the matching number or the TTL attribute in the header of the Open Token message. Before the FDSP server transmits the Open Token message with the broadened scope, the FDSP server determines at box 1312 if the scope is at a maximum value. If the scope of the Open Token message is not at a maximum value, the Open Token message is re-transmitted in box 1302. Thus, the FDSP server continually re-transmits the Open Token message until it has received a Token Request message from a FDSP client or until the Open Token message has reached a maximum value. The maximum value may be based on the maximum depth of the multicast tree. It can be configured based upon the network topology information after knowledge of how the network is organized. It can also be determined automatically by using the UNIX "Traceroute" utility and counting the number of hops.

At box 1312, if the FDSP server determines that the scope of the Open Token message is at a maximum scope, the FDSP server assumes that all FDSP clients have received all segments of the data file and thus terminates the process of searching for subsequent active receivers 1300 and ultimately the server terminates the FDSP process until the transmission of the next data file. Since the FDSP clients ignore the Open Token messages when they have all of the data segments, the FDSP server can assume that all FDSP clients have the complete file when the FDSP server fails to receive an Open Grant message from the FDSP clients.

The FDSP server may also use other procedures to verify if all FDSP clients have received all of the data segments. For example, if the FDSP server uses explicit group management and knows the total number of receivers, it can verify whether all receivers have received the file or not by polling FDSP clients that were never selected as an active receiver. Alternatively, the FDSP server can use group "join" and "sign-off" procedures to verify if each FDSP client has received the entire data file. The "join" and "sign-off" procedure is advantageous because the sender immediately knows the identity of FDSP clients that successfully received the distributed file. The join and sign-off procedure is detailed in the IGMP protocol.

FDSP also supports abnormal termination of a multicast distribution session. The FDSP server can suspend the multicast distribution at any time by sending a Reset message. Upon the receipt of a Reset message, all FDSP clients clean up their protocol state. This means that the server has aborted the current distribution and will no longer continue with the current data distribution for the time being. This also means that the clients should free up the memory used by a half-delivered file and should not expect any more data to complete the file. The FDSP server sends this message only when it is being taken off-line during multicast distribution. FDSP clients that have the complete file distribution ignore this message.

Limiting Repair Transmissions

FDSP also includes two novel mechanisms to minimize network traffic by reducing the number of multicast transmissions. These two mechanisms are called "backward looking" and "forward looking."

To implement the backward looking technique, the FDSP server maintains a list of all data packets that have been previously re-transmitted as a result of the active receivers' NACK's. If the FDSP server has previously multicast a packet in response to a retransmission request, the FDSP server assumes that the packet loss is local to the current active receiver and that particular data packet is only re-transmitted using a unicast transmission. Thus, each data packet is re-transmitted by a multicast transmission only one time after a re-transmission request. Each time a subsequent active receiver requests a particular data packet, that particular data packet is sent using a unicast protocol. If the network is using an application level multicast forwarding tree, the active receiver requesting a second retransmission of a data packet may be advised to multicast this data packet to its downstream receivers.

To implement the forward looking technique, the FDSP server maintains a list of FDSP clients that respond to the Open Token request sent in the selection process 401. In addition to selecting one active receiver, the FDSP server selects two or three other FDSP clients from the list and sends them a Send NACK Immediate message using a unicast transmission. If the FDSP server receives a NACK with a bitmap of lost packets from these selected receivers, it compares those bitmaps with the bitmap of the active receiver. This comparison allows the FDSP server to track the packets that were only lost by the active receiver and the packets that were also lost by other receivers. This method allows the FDSP server assume that each packet loss is a local receiver loss unless two or more FDSP clients request a retransmission for that particular packet. Network traffic is reduced because the FDSP server only re-transmits data packets by a multicast transmission when more that one client requests that particular packet and all other packets are re-transmitted by a unicast transmission.

In addition to reducing the multicasting transmissions, FDSP also reduces the possibility of communication errors by controlling the data rate of the file transmission to a specified bandwidth. Specifically, the FDSP server uses a rate limiting mechanism to maintain an optimum transfer rate without exceeding the peak transmission rate of the network. In this mechanism, the active receiver is responsible for providing feedback of the data transfer during the data distribution process 1100.

In this process, the active receiver keeps track of the number of packets lost, $P_{sent}$, over a window of $W_1$ data segments. A suggested value for $W_1$ is approximately 64 data segments. After the active receiver obtains the last data segment of the $W_1$ window, the active receiver sends a flow control message to the FDSP server giving the number of lost data segments, $P_{lost}$, in the last monitoring window. The ratio of lost segments $P_{lost}$ divided by the number of data segments in transmitted, $P_{sent}$, determines the quantum of rate reduction. The new rate, $W_{new}$, can be adjusted according to the following formula:

$$W_{new} = W_{cur} - (P_{lost}/P_{sent}) * W_{cur}$$

Where $W_{cur}$ is the current rate of transmission in units of Kbytes per second.

If all $W_1$ segments are successfully received during the monitoring window, the active receiver sends a flow control message showing a zero packet loss. The FDSP server then computes its new transmission rate, $W_{new}$, using the following formulas:

i) if $(W_{last} - W_{cur}) >= 1$ $$W_{new} = W_{cur} + \alpha(W_{last} - W_{cur})$$

ii) if $(W_{last} - W_{cur}) < 1$ $$W_{new} = W_{cur} + \beta(W_{max} - W_{cur})$$

Here, $W_{max}$ is the maximum rate configured in the FDSP Server, $W_{last}$ is the rate at which the last rate decrease took place, $W_{cur}$ is the current rate, and $\alpha$ and $\beta$ are rate adjustment factors with value between 0 and 1. The value of $\alpha$ controls how fast the server increases the transmission rate to get back to the rate at which the last loss occurred, and the value of $\beta$ controls the rate increment after crossing over the $W_{last}$ rate. The suggested value for $\alpha$ is 0.5, which means a rapid recovery, and the suggested value for $\beta$ is 0.1 which translates a slow increment in the data rate. If no maximum rate limiting is required, then $W_{max}$ can be defined to be a very high value.

To maintain efficient data transfer, if a flow control messages is delayed, that flow control message should be discarded by the FDSP server without processing. Any flow control message delayed more than approximately 256 transmitted data segments is considered as a delayed message. In addition, a server can optionally solicit for other flow control information from FDSP clients other than the active receiver. This is done by enabling a few more receivers that responded to an Open Token message in the selection process 500 using a mechanism similar to token granting. These receivers are called associate active receivers. The FDSP server can then use the minimum or average rate recommendation from several receivers to control flow of the data distribution.

FDSP also includes a mechanism for managing "late joiners," clients that join the group during the multicast data distribution process 1100. Since many receivers may join the group during the distribution process, it is important to prevent a Token Request from late joiners to avoid multicasting a large number of data segments that the late joiner missed. FDSP addresses the problem of late joiners by making sure the first active receiver is always selected from the group of FDSP clients that were members of the distribution group before the data distribution process 1100. Late joiners are also prevented from being selected as active receivers as each late joiner marks its Token Request messages with a Late Joiner Attribute. Each time a late joiner requests a data segment it is only updated using unicast data transmission. In addition, the Token Request messages from a late joiner are only processed if no other FDSP client has sent a Token Request. This ensures that only required packets are sent using unicast to late joiners while allowing them to receive most of their packets using normal multicast distribution.

The FDSP server allows each FDSP client to determine if it is a late joiner by including a New File Attribute in a small percentage, e.g. 5%, of the data packets transmitted in the data distribution process 1100. If a FDSP client does not receive any data packets with the New File Attribute, that FDSP client considers itself as a late joiner. As described above, each Token Request sent by a late joiner includes a Late Joiner Attribute until a new data file is transmitted.

FDSP Synchronization Protocol

In addition to the data transfer and flow control mechanisms, FDSP also utilizes a unique file synchronization protocol. As previously described, each data file in the FDSP server has a name or a unique file identifier that maps that data file to a particular data file in all of the receiving clients. In addition, each distributed data file is identified with a unique version number. When the FDSP server increases the version number of a file by 1 every time the server distributes new data for that particular data file. The FDSP synchronization protocol allows the FDSP server to continually update the file version number with each FDSP client while the FDSP file distribution process 400 is in progress.

Figure 14A:
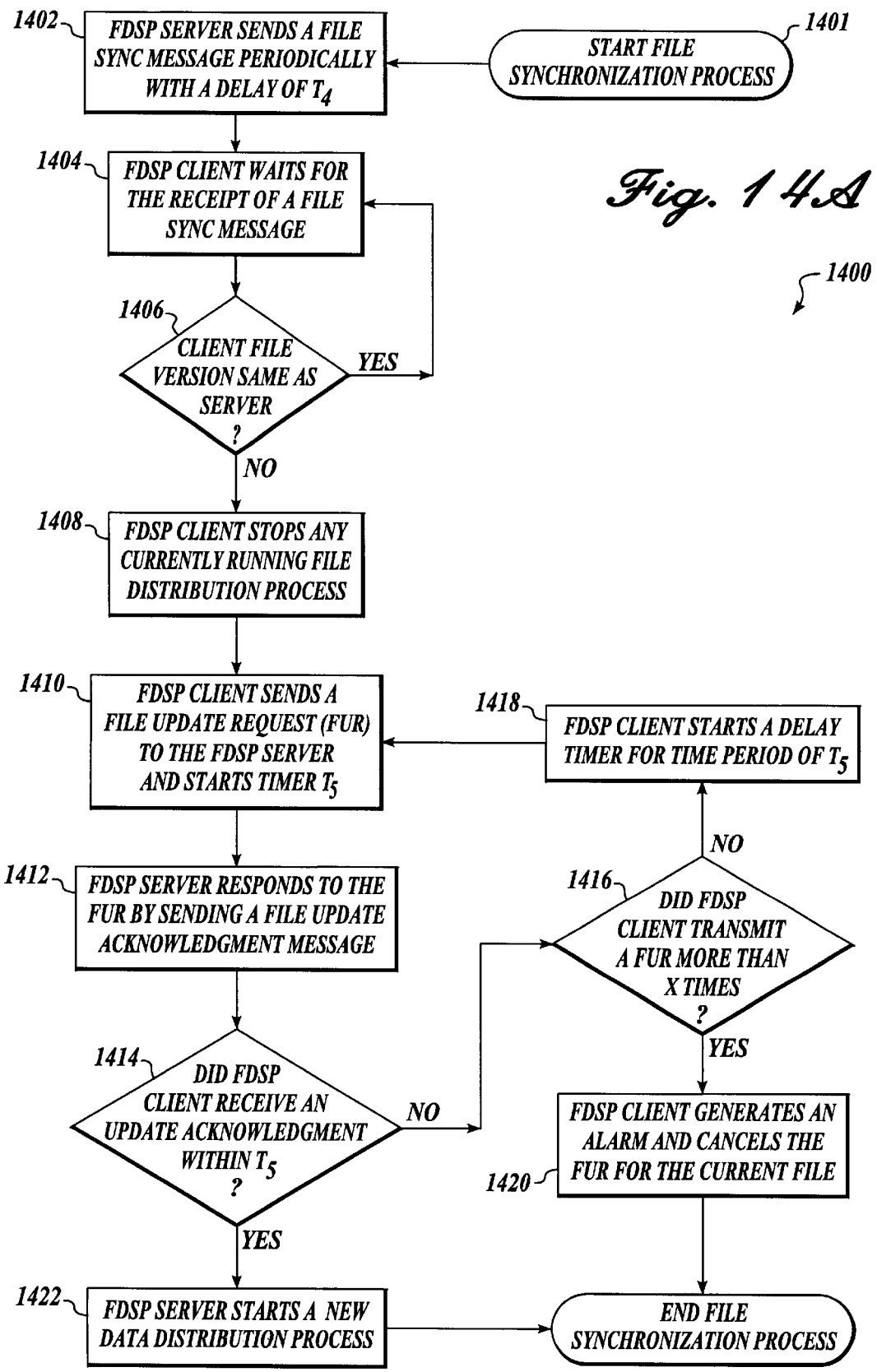
FIG. 14A is a logic diagram of the file synchronization process.

FIG. 14A is a flow chart of the file synchronization process 1400 as the procedure is implemented on a network having one FDSP server connected to a plurality of FDSP clients. The synchronization protocol begins at box 1402 where the FDSP server multicasts a series of File Sync messages to all FDSP clients with a delay period of $T_4$ between each message. The value of $T_4$ is configurable, but in one actual embodiment, is 15 minutes. The File Sync messages communicate the version number of the last file distributed by the FDSP server to each FDSP client.

At the same time, as shown in box 1404, each FDSP client is configured to receive the File Sync messages.

As shown in box 1406, as each FDSP client receives each File Sync message, they each compare the version of its stored file with the file version advertised in File Sync message. If a FDSP client does not detect a difference in the file version at box 1404, the logic returns to box 1404 where the FDSP client waits to receive subsequent File Sync messages from the FDSP server.

If a particular FDSP client detects a difference in the file versions at box 1404, that FDSP client carries out the logic in box 1408 where it aborts any currently running distribution processes repairing an incomplete file from a previous data distribution session. Next, at box 1410, the FDSP client registers a file update request with the FDSP server by sending a File Update Request message. At this point, the FDSP client starts a timer to check the round response time of the File Update Request message.

As shown in box 1412, when the FDSP server receives the client File Update Request message, the FDSP server responds by sending a File Update Acknowledgment message back to the FDSP client via a unicast transmission. After the FDSP server receives the first File Update Request message, the FDSP server rejects any duplicate File Update Request messages from all FDSP clients. The logic then continues at box 1414 where the FDSP client makes a determination of whether it has received the File Update Acknowledgment message within a time period of $T_5$. Again, the time limit of $T_5$ is measured from the time the FDSP client sent the File Update Request message in box 1410. The preferred value for $T_5$ is 10 seconds.

If a particular FDSP client does not receive a File Update Acknowledgment message within the $T_5$ time limit, that FDSP client then makes a determination of whether it has transmitted the File Update Request message more than a maximum, X, number of times. The preferred value of X is three. If the FDSP client determines that it has not transmitted the File Update Request message more than X times, the logic proceeds to box 1418 where the FDSP client executes a delay mechanism of $T_5$ before another File Update Request message is re-transmitted in box 1410. However, at box 1416, if the FDSP client determines that it has transmitted the File Update Request message more than X times, the FDSP client generates an alarm and makes no further attempt to solicit a response from the FDSP server until it receives a new File Sync message. At this point, the logic returns to box 1402 where the FDSP server continues to transmit File Sync messages to the FDSP clients.

However, at box 1414, if the FDSP client receives a File Update Acknowledgment message from the FDSP server within the $T_5$ time limit, the FDSP starts a file redistribution procedure for the FDSP file synchronization process. This procedure, shown in box 1422, allows the FDSP server to update the FDSP client with the current file version before returning to the File Sync message broadcast procedure of box 1402.

A detailed description of the file redistribution procedure of box 1422 is illustrated in FIG. 14B. As shown in box 1452, the FDSP server starts the file redistribution process 1422 by recording the identification of the FDSP clients that have responded with a File Update Request. Here, the FDSP server builds a file redistribution list of all responding FDSP clients and continues to record the identification of each responding FDSP client for a time period of $T_6$. This delay allows the FDSP server to wait for other FDSP clients that may respond to the File Sync message. The time period of $T_6$ starts from the time the FDSP server sent the File Update Acknowledgment message in box 1412. The preferred value of $T_6$ is 2 minutes.

Next, in box 1454, the FDSP server determines whether the number of FDSP clients in the redistribution list is more than a multicast threshold, $M_{thresh}$. The multicast threshold, $M_{thresh}$, is a preset value used to determine how to transfer the file to the FDSP clients requesting re-synchronization. The preferred value of $M_{thresh}$ is between 6 to 10.

If the FDSP server determines that the number of FDSP clients in the redistribution list exceeds $M_{thresh}$, the logic continues to box 1456 where the FDSP server redistributes the previous file version is using multicast transmission. For example, if the last File Sync message advertised a file version of 12, the FDSP server would now redistribute the 11th version of that file. As shown in box 1458, as each FDSP client receives the multicast transmission of the data file they compare the file version in the multicast with the file version of their currently stored file. As shown in box 1460, any FDSP client that contains the previous file version ignores the multicast transmission. Conversely, as shown in box 1462, any FDSP client that does not contain the same file distributed in the multicast transmission stores the data file in the multicast transmission of box 1456. The procedure used to carry out the multicast transmission in box 1462 is identical to the initial file distribution process 400 as shown in FIG. 4.

Otherwise, if the FDSP server determines that the number of FDSP clients in the redistribution list does not exceed $M_{thresh}$, the logic continues to box 1462 where the FDSP server distributes the current file using a unicast transmission. All aspects of the unicast update are identical to the initial file distribution process 400 as shown in FIG. 4 except the file distribution process incorporates a unicast transmission instead of a multicast transmission. During this process, the FDSP client receiving the new file operates in the same manner as the active receiver in the multicast distribution as that particular FDSP client also monitors flow control and NACK messages.

The file synchronization process 1400 addresses the problem of lost NACK messages during unicast file transfer 1462 in the same manner as the data distribution process 1100 and the retransmission request process 1200 shown in FIGS. 11 and 12. The value of the time-out period, $T_2$, is calculated in the same manner as the data distribution process 1100 and, similar to box 1108, the FDSP server limits the NACK solicitation transmissions to a maximum of five times. Thus, if the FDSP server does not receive a NACK response after X attempts, the FDSP server generates an alarm.

Large Groups and Scalability

The basic approach presented can be expanded to distribute a data file to a very large number of receivers. Two basic approaches are possible: a "divide and conquer" or a hierarchical approach. In the divide and conquer approach, the group of receivers must be divided into several small manageable multicast groups. This approach requires creation of several smaller sub-distribution trees, where each sub-distribution tree is independent of other sub-distribution trees. For example, if a network consists of N receivers, the set of N receivers is divided into two groups of $N_1$ and $N_2$. Here, the FDSP server may distribute the data files to receiver set $N_1$ and $N_2$ by one of the two methods depending upon the application requirements. The FDSP server may distribute the data files to each group separately, at the same time or one after another.

In the second approach, receivers are organized in a multi-level hierarchy. This method is characterized by one main distribution group and a number of topological localized subgroups. The subgroups each have their own multicast address. Each subgroup includes only one member from the receivers that is part of the main distribution group that first receives the distribution from the original sender. This receiver becomes the new sender and it is assigned the responsibility of distributing the data file to the sub group using the main distribution protocol.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of providing reliable data transfer in a communications network, said communications network coupling a plurality of receiving clients and a file server, wherein an IP address including a plurality of bytes identifies each receiving client of said plurality of receiving clients, the method comprising the steps of:
    (a) selecting an active receiver from said plurality of receiving clients;
    (b) transmitting a data file from said file server to said plurality of receiving clients, wherein said data file consists of a plurality of data segments;

(c) if said active receiver detects the absence of at least one data segment of said plurality of data segments after the completion of said transmitting step, said active receiver exclusively requests retransmission of data segments not received by said active receiver, wherein said active receiver communicates to said file server by use of a retransmission request;

(d) responsive to said retransmission request from said active receiver, re-transmitting said data segments from said file server to said active receiver, wherein said re-transmitting step sends said data segments indicated by said retransmission request;

(e) determining if at least one receiving client of said plurality of receiving clients detects the absence of at least one data segment of said plurality of data segments;

(f) if at least one receiving client of said plurality of receiving clients detects the absence of at least one data segment of said plurality of data segments, reselecting a succeeding active receiver from said plurality of receiving clients;

(g) determining if said active receiver detects the absence of at least one data segment of said plurality of data segments; and (h) if said succeeding active receiver detects the absence of at least one data segment of said plurality of data segments, repeating said requesting step (c) through said reselecting step (f).

2. A method as defined in claim 1, wherein said retransmitting step (d) also includes retransmitting said data segments from said file server to said plurality of receiving clients using a multicast transmission.

3. A method as defined in claim 1, wherein said selecting step (a) comprises the steps of:

(i) transmitting a data packet containing an Open Token message over said communications network from said file server to said plurality of receiving clients, wherein said data packet also contains a time-to-live attribute that determines the duration of said data packet transmission through said communications network;

(ii) responsive to said Open Token message, communicating a Token Request message from said plurality of receiving clients to said file server;

(iii) at said file server, determining if at least one Token Request message is received from said plurality of receiving clients;

(iv) if said file server does not receive said Token Request message at determining step (iii),
increasing said time-to-live attribute in said data packet, thereby increasing the duration of said data packet transmission;
repeating said transmitting step (i) through said increasing step (iv) until at least one Token Request message is received by said file server; and (v) responsive to a received Token Request message transmitted from any one said receiving client, thereby creating a responding receiving client, at said file server, selecting one responding receiving client as an active receiver.

4. A method as defined in claim 1, wherein said selecting step (a) comprises the steps of:

(i) broadcasting a data packet containing an Open Token message over said communications network from said file server to said plurality of receiving clients, wherein said data packet also contains a base number attribute and a matching number attribute;

(ii) on each receiving client, a predetermined byte from its own said IP address, thereby creating a primary byte;

(iii) on each said receiving client receiving said Open Token message, dividing said primary byte by said base number attribute contained in the received Open Token message, thereby creating a quotient value on each receiving client;

(iv) on each said receiving client receiving said Open Token message, if said quotient value is less than said matching number attribute contained in the received Open Token message, transmitting a Token Request message from said receiving client to said file server;

(v) at said file server, determining if at least one Token Request message is received from said plurality of receiving clients;

(vi) if said file server does not receive said Token Request message at determining step (v),
increasing said matching number attribute in said data packet, thereby increasing the number of said receiving clients responsive to said Open Token message;
repeating said broadcasting step (i) through said increasing step (vi) until at least one Token Request message is received by said file server; and (v) responsive to a received Token Request message transmitted from any one said receiving client, thereby creating a responding receiving client, at said file server, selecting one responding receiving client as an active receiver.

5. A method as defined in claim 1, wherein said selecting step (a) comprises the steps of:

(i) transmitting a data packet containing an Open Token message over said communications network from said file server to said plurality of receiving clients, wherein said data packet also contains a base number attribute, a matching number attribute, and a time-to-live attribute that determines the duration of said data packet transmission through said communications network;

(ii) on each receiving client, choosing a predetermined byte from its own said IP address, thereby creating a primary byte;

(iii) on each said receiving client receiving said Open Token message, dividing said primary byte by said base number attribute contained in the received Open Token message, thereby creating a quotient value on each receiving client;

(iv) on each said receiving client receiving said Open Token message, if said quotient value is less than said matching number attribute contained in the received Open Token message, transmitting a Token Request message from said receiving client to said file server;

(v) at said file server, determining if at least one Token Request message is received from said plurality of receiving clients;

(vi) if said file server does not receive said Token Request message at said determining step (v),
at said file server, increasing said time-to-live attribute in said data packet, thereby increasing the duration of said data packet transmission;
repeating said transmitting step (i) through said increasing step (vi) until at least one Token Request message is received by said file server;

(vii) if said file server receives more than a predetermined number of said Token Request messages at said determining step (v), at said file server, decreasing said matching number attribute in said data packet, thereby decreasing the number of receiving clients responsive to said Open Token message;

repeating said transmitting step (i) through said decreasing step (vii) until said file server receives less than said predetermined number of said Token Request messages at said determining step (v); and (viii) responsive to a received Token Request message transmitted from said receiving client, thereby creating a responding receiving client, at said file server, selecting one responding receiving client as an active receiver.

6. A method as defined in claim 1, wherein said requesting step (c) includes the steps of transmitting a retransmission request comprising a segment number and a bitmap, wherein said segment number identifies a number of consecutively received data segments, and wherein said bitmap identifies individual data segments received and not received by said active receiver.

7. A method as defined in claim 1, wherein said requesting step (c) comprises the steps of:

ordering received data segments, wherein said received data segments are from said plurality of sequentially numbered data segments;

determining a value for a segment number, wherein said segment number is determined to be the highest sequence number of data segment consecutively received by said active receiver;

constructing a bitmap, wherein said bitmap comprises a series of binary numbers, and wherein said binary numbers indicate data segments received and lost by said active receiver; and transmitting a data packet to said file server, wherein said data packet comprises said segment number and said bitmap.

8. A method as defined in claim 1, wherein said reselecting step (e) comprises the steps of:

(I) broadcasting a data packet containing an Open Token message over said communications network from said file server to said plurality of receiving clients, wherein said data packet also contains a base number attribute and a matching number attribute;

(II) at said file server, determining if at least one Token Request message has been received from said plurality of receiving clients within a specified time period;

(III) if said file server receives said Token Request message at determining step (II) within said specified time period, reselecting a subsequent active receiver from said plurality of receiving clients;

(IV) if said file server does not receive said Token Request message at determining step (II), (i) increasing said matching number attribute in said data packet, thereby increasing the number of said receiving clients responsive to said Open Token message;

(ii) if said matching number is greater than a predetermined maximum value at said determining step (IV)(ii), terminating said reselecting process; and (iii) if said matching number is less than said predetermined maximum value at said determining step (IV)(ii), repeating said broadcasting step (I) through said repeating step (IV)(iii).

9. A method as defined in claim 1, wherein said reselecting step (e) includes the steps of:

(I) transmitting a data packet containing an Open Token message over said communications network from said file server to said plurality of receiving clients, wherein said data packet also contains a time-to-live attribute that determines the duration of said data packet transmission through said communications network;

(II) at said file server, determining if at least one Token Request message is received from said plurality of receiving clients within a predetermined time limit;

(III) if said file server receives at least one said Token Request message at determining step (II) within said predetermined time limit, at said file server, selecting one responding receiving client as an active receiver;

(IV) if said file server does not receive said Token Request message at determining step (II), (i) increasing said time-to-live attribute in said data packet, thereby increasing the duration of said data packet transmission;

(ii) if said time-to-live attribute is greater than a predetermined maximum time-to-live value, terminating said reselecting process; and (iii) if said time-to-live attribute is less than said predetermined maximum time-to-live value, repeating said transmitting step (I) through said repeating step (IV)(iii).

10. A method of providing reliable file synchronization between a file server and a plurality of receiving clients coupled by a communications network, said file server contains a plurality of data files, each data file of said plurality of data files is identified with a sequenced version number, and wherein each receiving client may contain a data file identified by a version number, comprising the steps of:

(a) at said file server, transmitting a file synchronization message to said plurality of receiving clients, wherein said file synchronization message communicates a version number of a selected data file of said plurality of data files on said file server;

(b) on each said receiving client receiving said file synchronization message, if said version number of said data file on said receiving client is different from said version number communicated in said file synchronization message, transmitting a file update request message to said file server, thereby creating a responding receiving client;

(c) on said file server, executing a delay mechanism, wherein said delay mechanism allows said file server to receive a plurality of said file update request messages from a plurality of responding receiving clients for a predetermined duration of time;

(d) responsive to said file update request message, on said file server, responding to each said update request message by sending a file update acknowledgment message to said responding receiving clients;

(e) after said predetermined duration of time, if said file server has received more than a predetermined limit of said file update request messages, multicasting a synchronization data file from said file server to said plurality of receiving clients, wherein said synchronization data file is selected from said plurality of data files on said file server, and wherein said synchronization data file identified by a version number less than said version number of said selected data file; and (f) after said predetermined duration of time, if said file server has received a number of said file update request messages less than or equal to said predetermined limit of said file update request messages, unicasting said selected data file from said file server to said responding receiving clients.

11. A method as defined in claim 10, wherein said transmitting step (a) also includes transmitting a plurality of file synchronization messages to said plurality of receiving clients.

12. A method as defined in claim 10, wherein said unicasting step (f) comprises the steps of:
   (a) selecting an active receiver from said responding receiving clients;
   (b) transmitting said selected data file from said file server to said responding receiving clients by the use of an unicast transmission, wherein said selected data file consists of a plurality of data segments;
   (c) after the completion of said transmitting step (b), if said active receiver detects the absence of at least one data segment of said plurality of data segments, at said active receiver, requesting retransmission of data segments not received by said active receiver, wherein said active receiver communicates to said file server by the use of a retransmission request;
   (d) responsive to said retransmission request from said active receiver, retransmitting said data segments from said file server to said active receiver, wherein said retransmitting step sends said data segments indicated by said retransmission request;
   (e) if at least one said responding receiving client detects the absence of at least one data segment of said plurality of data segments, reselecting a succeeding active receiver from said plurality of responding receiving clients; and
   (f) if said succeeding active receiver detects the absence of at least one data segment of said plurality of data segments, repeating said requesting step (c) through said reselecting step (e).

13. A method as defined in claim 10, wherein said multicasting step (e) comprises the steps of:
   (a) selecting an active receiver from said responding receiving clients;
   (b) transmitting said synchronization data file from said file server to said plurality of receiving clients by the use of a multicast transmission, wherein said synchronization data file consists of a plurality of data segments;
   (c) if said active receiver detects the absence of at least one data segment of said plurality of data segments after the completion of said transmitting step (b), at said active receiver, requesting retransmission of data segments not received by said active receiver, wherein said active receiver communicates to said file server by the use of a retransmission request;
   (d) responsive to said retransmission request from said active receiver, retransmitting said data segments from said file server to said active receiver, wherein said retransmitting step sends said data segments indicated by said retransmission request;
   (e) if at least one said responding receiving client detects the absence of at least one data segment of said plurality of data segments, reselecting a succeeding active receiver from said plurality of responding receiving clients; and
   (f) if said succeeding active receiver detects the absence of at least one data segment of said plurality of data segments, repeating said requesting step (c) through said reselecting step (e).

14. A method as defined in claim 12 or 13, wherein said retransmitting step (d) also includes retransmitting said data segments from said file server to said plurality of responding receiving clients using a multicast transmission.

15. A method as defined in claim 12 or 13, wherein said selecting step (a) comprises the steps of:
   (i) transmitting a data packet containing an Open Token message over said communications network from said file server to said plurality of receiving clients, wherein said data packet also contains a time-to-live attribute that determines the duration of said data packet transmission through said communications network;
   (ii) responsive to said Open Token message, communicating a Token Request message from said plurality of receiving clients to said file server;
   (iii) at said file server, determining if at least one Token Request message is received from said plurality of receiving clients;
   (iv) if said file server does not receive said Token Request message at determining step (iii),
      increasing said time-to-live attribute in said data packet, thereby increasing the duration of said data packet transmission;
      repeating said transmitting step (i) through said increasing step (iv) until at least one Token Request message is received by said file server; and
   (v) responsive to a received Token Request message transmitted from any one said receiving client, at said file server, selecting one responding receiving client as an active receiver.

16. A method as defined in claims 12 or 13, wherein said selecting step (a) comprises the steps of:
   (i) broadcasting a data packet containing an Open Token message over said communications network from said file server to said plurality of receiving clients, wherein said data packet also contains a base number attribute and a matching number attribute;
   (ii) on each receiving client, selecting a predetermined byte from its own said IP address, thereby creating a primary byte;
   (iii) on each said receiving client receiving said Open Token message, dividing said primary byte by said base number attribute contained in the received Open Token message, thereby creating a quotient value on each receiving client;
   (iv) on each said receiving client receiving said Open Token message, if said quotient value is less than said matching number attribute contained in the received Open Token message, transmitting a Token Request message from said receiving client to said file server;
   (v) at said file server, determining if at least one Token Request message is received from said plurality of receiving clients;
   (vi) if said file server does not receive said Token Request message at determining step (v),
      increasing said matching number attribute in said data packet, thereby increasing the number of said receiving clients responsive to said Open Token message;
      repeating said broadcasting step (i) through said increasing step (vi) until at least one Token Request message is received by said file server; and
   (v) responsive to a received Token Request message transmitted from any one said receiving client, at said file server, selecting one responding receiving client as an active receiver.

17. A method as defined in claim 12 or 13, wherein said selecting step (a) comprises the steps of:

(i) transmitting a data packet containing an Open Token message over said communications network from said file server to said plurality of receiving clients, wherein said data packet also contains a base number attribute, a matching number attribute, and a time-to-live attribute that determines the duration of said data packet transmission through said communications network;

(ii) on each receiving client, selecting a predetermined byte from its own said IP address, thereby creating a primary byte;

(iii) on each said receiving client receiving said Open Token message, dividing said primary byte by said base number attribute contained in the received Open Token message, thereby creating a quotient value on each receiving client;

(iv) on each said receiving client receiving said Open Token message, if said quotient value is less than said matching number attribute contained in the received Open Token message, transmitting a Token Request message from said receiving client to said file server;

(v) at said file server, determining if at least one Token Request message is received from said plurality of receiving clients;

(vi) if said file server does not receive said Token Request message at said determining step (v),
at said file server, increasing said time-to-live attribute in said data packet, thereby increasing the duration of said data packet transmission;
repeating said transmitting step (i) through said increasing step (vi) until at least one Token Request message is received by said file server;

(vii) if said file server receives more than a predetermined number of said Token Request messages at said determining step (v),
at said file server, decreasing said matching number attribute in said data packet, thereby decreasing the number of receiving clients responsive to said Open Token message;
repeating said transmitting step (i) through said decreasing step (vii) until said file server receives less than said predetermined number of said Token Request messages at said determining step (v); and (viii) responsive to a received Token Request message transmitted from said receiving client, thereby creating a responding receiving client, at said file server, selecting one responding receiving client as an active receiver.

18. A method as defined in claim 1, 12, or 13, wherein said active receiver provides a feedback communication to said file server during said transmitting step (b), and wherein said feedback communication allows said file server to control the data rate of said transmitting step (b).

19. A method as defined in claim 1, 12, or 13, further comprising the steps of:
at said file server, recording all said data segments sent in said retransmitting step (d), thereby creating a plurality of resent data segments; and
in each repeated occurrence of said retransmitting step (d), if said retransmission request indicates a retransmission of any said resent data segment of said plurality of resent data segments, unicasting said resent data segment to said active receiver.

20. A method as defined in claim 1, 12, or 13, further comprising the steps of:
on said file server, selecting a subset of receiving clients from said plurality of receiving clients;
at each receiving client in said subset of receiving clients, requesting retransmission of data segments not received by each receiving client, wherein each receiving client in said subset of receiving clients communicates to said file server by the use of a retransmission request;
responsive to said retransmission requests from said active receiver and said receiving clients in said subset of receiving clients, on said file server, determining all specific data segments requested from more than one receiving client, thereby creating a plurality of specific data segments; and
on said file server, multicasting said plurality of specific data segments from said file server to said active receiver and said receiving clients in said subset of receiving clients.

21. A method as defined in claim 1, 12, or 13, wherein said transmitting step (b) also includes transmitting a new file attribute in a small percentage of said plurality of data segments, and wherein said reselecting step (e) also includes prioritizing said plurality of receiving clients such that receiving clients receiving at least one said new file attribute are first selected as said succeeding active receivers.

22. A method as defined in claim 21 wherein said small percentage of said plurality of data segments is less than 10%.

23. A method of controlling a data rate in a communications network coupling a file server to a plurality of receiving clients, and an active receiver, comprising the steps of:

(a) on said file server, transmitting a data file to said receiving clients and said active receiver, wherein said data file comprises a series of sequentially numbered data segments, and wherein said transmitting step is carried out at a current data rate;

(b) on said active receiver, tracking a number of data packets not received during said transmitting step (a), thereby creating a total number of lost packets, wherein tracking step is executed until said file server transmits a predetermined number of said sequentially numbered data segments;

(c) on said active receiver, transmitting said total number of lost packets to said file server;

(d) on said file server, if said total number of lost packets is greater than zero, calculating a new data rate by the following expression:

$$W_{new} = W_{cur} - (P_{lost}/P_{sent}) * W_{cur},$$

wherein $W_{new}$ denotes said new data rate, thereby creating a new value of, $W_{last}$, a last decreased data rate,
wherein $W_{cur}$ denotes said current rate of transmission,
wherein $P_{lost}$ denotes said number of data packets not received by said active receiver, and
wherein $P_{sent}$ denotes said predetermined number of said sequentially numbered data segments transmitted from said file server;

(e) on said file server, if said total number of lost packets is equal to zero, and if the subtraction of said current data rate from said last decreased data rate is greater than or equal to one, calculating a new data rate by the following expression:

$$W_{new} = W_{cur} + \alpha(W_{last} - W_{cur}),$$

wherein $W_{new}$ denotes said new data rate,
wherein $W_{cur}$ denotes said current rate of transmission, and wherein $W_{last}$ denotes said last decreased data rate, and
wherein α denotes a first predetermined adjustment factor;

(f) on said file server, if said total number of lost packets is equal to zero, and if the subtraction of said current data rate from said last decreased data rate is less than one, calculating a new data rate by the following expression:

$$W_{new} = W_{cur} + \beta(W_{max} - W_{cur}),$$

wherein $W_{new}$ denotes said new data rate,
wherein $W_{cur}$ denotes said current rate of transmission,
wherein $W_{max}$ denotes a predetermined maximum data rate, and
wherein $W_{max}$ denotes a second predetermined adjustment factor;

(g) on said file server, adjusting said current data rate equal to said new data rate, thereby adjusting said data rate of transmitting step (a); and (h) repeating said tracking step (b) through said adjusting step (g), wherein repeating step is repeated until file server transmits all data segments of said data file.

24. A method as defined in claim 23 further including the step of:

on said file server, selecting a subset of receiving clients from said plurality of receiving clients;

on said receiving clients in said subset, tracking a number of data packets not received during said transmitting step (a), thereby creating a total number of lost packets on each receiving client in said subset, wherein tracking step is executed until said file server transmits a predetermined number of said sequentially numbered data segments;

on receiving clients in said subset, transmitting said total number of lost packets to said file server; and on said file server, calculating a total number of lost packets from an average of said total number of lost packets received from said active receiver and said subset of receiving clients.

* * * * *

UNITED STATES PATENT AND TRADEMARK OFFICE
CERTIFICATE OF CORRECTION

PATENT NO. : 6,269,080 B1
DATED : July 31, 2001
INVENTOR(S) : B. Kumar

It is certified that error appears in the above-identified patent and that said Letters Patent is hereby corrected as shown below:

Title page,
Item [57], ABSTRACT,
Line 16, "medium./C" should read -- medium. --

Column 22,
Line 25, "(v)" should read -- (vii) --

Column 24,
Line 60, "file identified" should read -- file is identified --

Column 25,
Line 10, "use of an" should read -- use of a --

Column 26,
Line 62, "(v)" should read -- (vii) --

Column 28,
Line 24, "claim 21" should read -- claim 21, --
Line 39, "tracking step" should read -- a tracking step --

Column 29,
Line 17, "$W_{max}$" should read -- $\beta$ --

UNITED STATES PATENT AND TRADEMARK OFFICE
CERTIFICATE OF CORRECTION

PATENT NO. : 6,269,080 B1
DATED : July 31, 2001
INVENTOR(S) : B. Kumar

It is certified that error appears in the above-identified patent and that said Letters Patent is hereby corrected as shown below:

Column 30,
Line 2, "wherein repeating step" should read -- wherein the repeating step --
Line 2, "repeated until file" should read -- repeated until the file --
Line 4, "claim 23" should read -- claim 23, --
Line 11, "subset, wherein" should read -- subset, wherein the --

Signed and Sealed this

Thirteenth Day of August, 2002

Attest:

JAMES E. ROGAN
Attesting Officer     Director of the United States Patent and Trademark Office